United States Patent
Cho et al.

(10) Patent No.: US 11,455,066 B2
(45) Date of Patent: Sep. 27, 2022

(54) TOUCH SENSOR AND DISPLAY DEVICE HAVING THE SAME

(71) Applicant: Samsung Display Co., Ltd., Yongin-si (KR)

(72) Inventors: Hyun Wook Cho, Yongin-si (KR); Ye Rin Oh, Yongin-si (KR); Min Hong Kim, Yongin-si (KR); Tae Joon Kim, Yongin-si (KR); Hyun Jae Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/931,387

(22) Filed: Jul. 16, 2020

(65) Prior Publication Data

US 2021/0117047 A1     Apr. 22, 2021

(30) Foreign Application Priority Data

Oct. 16, 2019   (KR) .................. 10-2019-0128733

(51) Int. Cl.
*G06F 3/044*     (2006.01)

(52) U.S. Cl.
CPC .......... *G06F 3/0446* (2019.05); *G06F 3/0443* (2019.05); *G06F 3/0448* (2019.05)

(58) Field of Classification Search
CPC ......... G06F 2203/04112; G06F 3/0443; G06F 3/0446; G06F 3/044; G06F 3/0445; G06F 3/041; G06F 3/0412; G06F 3/0488; G06F 3/0448; G06F 2203/0412

USPC ................................................. 345/170–178
See application file for complete search history.

(56) References Cited

U.S. PATENT DOCUMENTS

| | | | | |
|---|---|---|---|---|
| 2013/0321340 A1* | 12/2013 | Seo | ........................ | G06F 1/1652 345/174 |
| 2015/0153779 A1* | 6/2015 | Ko | ......................... | G06F 1/1643 345/173 |
| 2015/0241924 A1* | 8/2015 | Chang | .................... | G06F 1/1652 349/12 |

(Continued)

FOREIGN PATENT DOCUMENTS

| CN | 203930770 | 11/2014 |
|---|---|---|
| CN | 208673308 | 3/2019 |

(Continued)

*Primary Examiner* — Dong Hui Liang
(74) *Attorney, Agent, or Firm* — H.C. Park & Associates, PLC

(57) ABSTRACT

A touch sensor for a display device includes: a base layer including first and second sensing regions adjacent to each other in a first direction and a non-sensing region surrounding at least one side of each of the first and second sensing regions; first sensors disposed in each of the first and second sensing regions and arranged along a second direction intersecting the first direction; second sensors disposed in each of the first and second sensing regions and arranged along the first direction; and at least one third sensor located in the first sensing region and the second sensing region, wherein the at least one third sensor includes first and second sub-sensors electrically separated at a boundary between the first sensing region and the second sensing region, and the first and second sub-sensors have substantially the same size.

19 Claims, 17 Drawing Sheets

(56) References Cited

U.S. PATENT DOCUMENTS

| | | | | |
|---|---|---|---|---|
| 2015/0346866 A1* | 12/2015 | Kusunoki | ............. | G06F 3/0412 |
| | | | | 345/174 |
| 2016/0170523 A1* | 6/2016 | Park | ...................... | G06F 3/0446 |
| | | | | 345/174 |
| 2016/0202782 A1* | 7/2016 | Park | ...................... | G06F 1/1652 |
| | | | | 345/173 |
| 2016/0282993 A1* | 9/2016 | Song | ................... | G06F 3/0446 |
| 2017/0131809 A1* | 5/2017 | Lin | ...................... | G06F 3/04164 |
| 2017/0371452 A1* | 12/2017 | Endo | .................... | G06F 3/04164 |
| 2018/0081473 A1* | 3/2018 | Seo | ....................... | H05K 5/0017 |
| 2018/0348930 A1* | 12/2018 | Lee | ..................... | G06F 3/04164 |
| 2019/0227657 A1 | 7/2019 | Shimizu | | |
| 2019/0377443 A1* | 12/2019 | Dong | ................... | G06F 3/0443 |
| 2020/0073512 A1 | 3/2020 | Jiang | | |
| 2020/0285280 A1* | 9/2020 | Zeng | .................... | G06F 1/1652 |
| 2020/0301558 A1* | 9/2020 | Luo | ....................... | G06F 1/1643 |
| 2020/0348787 A1* | 11/2020 | Wang | ................... | G06F 3/0446 |
| 2021/0132724 A1* | 5/2021 | Kwon | ................. | H01L 27/3244 |
| 2021/0151542 A1* | 5/2021 | Choe | ................... | H01L 27/3265 |
| 2021/0183273 A1* | 6/2021 | Lius | ......................... | G09F 9/301 |
| 2021/0208711 A1* | 7/2021 | Ye | ............................ | G06F 3/045 |
| 2021/0223883 A1* | 7/2021 | Xu | ........................... | G06F 3/044 |

FOREIGN PATENT DOCUMENTS

| | | |
|---|---|---|
| KR | 10-1579462 | 12/2015 |
| KR | 10-2019-0041962 | 4/2019 |

\* cited by examiner

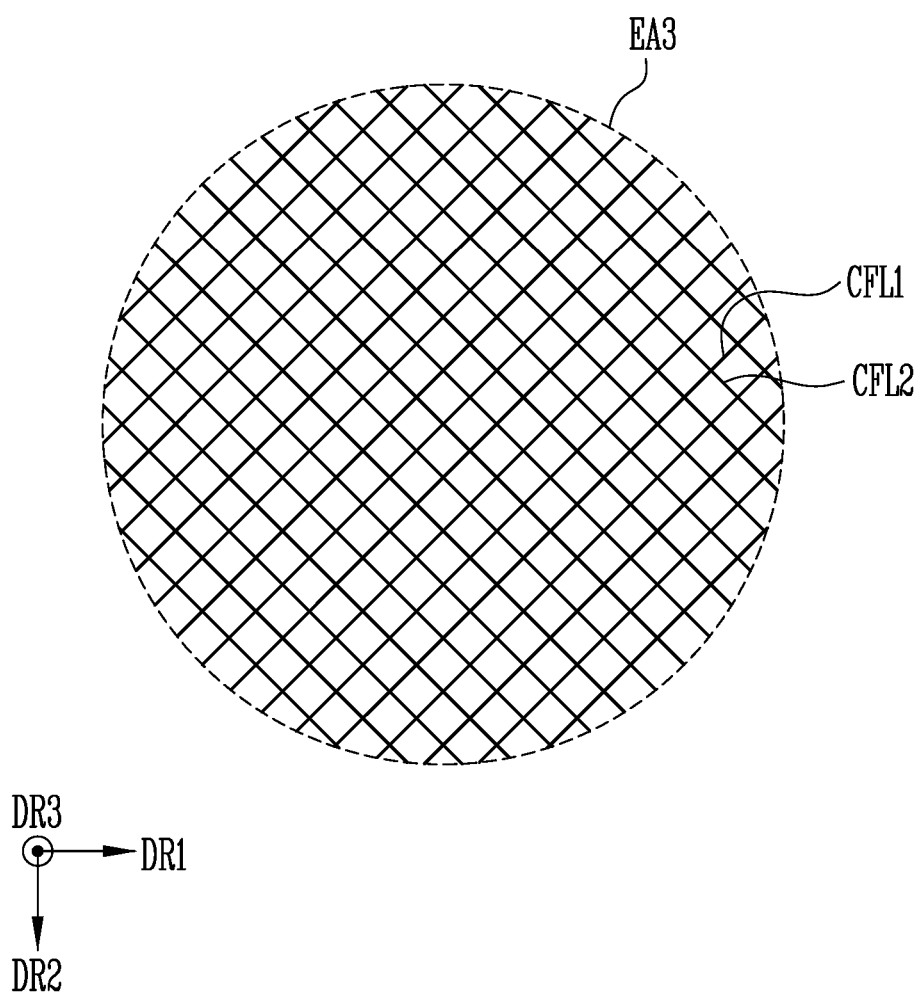

TOUCH SENSOR AND DISPLAY DEVICE HAVING THE SAME

CROSS-REFERENCE TO RELATED APPLICATION

This application claims priority from and the benefit of Korean Patent Application No. 10-2019-0128733, filed on Oct. 16, 2019, which is hereby incorporated by reference for all purposes as if fully set forth herein.

BACKGROUND

Field

Exemplary implementations of the invention relate generally to a touch sensor and, more particularly, to a display device having the same.

Discussion of the Background

A touch sensor is a kind of information input device, and may be provided and used in a display device. In an example, the touch sensor may be attached to one surface of a display panel or be integrally formed with the display panel. A user may input information by pressing or touching the touch sensor while viewing an image displayed on a screen. The touch sensor may include sensor patterns and sensing lines. When the touch sensor is applied to a large-area display device, the touch sensor may be divided into independently driven regions so as to minimize the load of the display device. Sensor patterns located at the boundary of the divided regions may have an electrical characteristic (e.g., resistance, capacitance, etc.) different from that of sensor patterns located in a corresponding divided region. A sensing sensitivity difference may occur for each region due to the difference in electrical characteristics between the sensor patterns located at the boundary of the divided regions and the sensor patterns located in the corresponding divided region.

The above information disclosed in this Background section is only for understanding of the background of the inventive concepts, and, therefore, it may contain information that does not constitute prior art.

SUMMARY

Applicant realized that minimizing the difference in electrical characteristics between the sensor patterns located at the boundary of the divided regions and the sensor patterns located in the corresponding divided region could improve touch pad performance.

Touch sensors and display devices including the same constructed according to the principles and exemplary implementations of the invention have more uniform sensing sensitivity, which may be accomplished by providing a sensor pattern between adjacent sensing regions.

Additional features of the inventive concepts will be set forth in the description which follows, and in part will be apparent from the description, or may be learned by practice of the inventive concepts.

According to one aspect of the invention, a touch sensor for a display device includes: a base layer including first and second sensing regions adjacent to each other in a first direction and a non-sensing region surrounding at least one side of each of the first and second sensing regions; first sensors disposed in each of the first and second sensing regions, the first sensors being arranged along a second direction intersecting the first direction, the first sensors being electrically connected to each other along the second direction; second sensors disposed in each of the first and second sensing regions, the second sensors being arranged along the first direction, the second sensors being electrically connected to each other along the first direction; and at least one third sensor located in the first sensing region and the second sensing region, wherein the at least one third sensor includes first and second sub-sensors electrically separated at a boundary between the first sensing region and the second sensing region, and the first and second sub-sensors have substantially the same size.

The first sensors may include first sensor patterns, the second sensors may include second sensor patterns, the at least one third sensor may include a third sensor pattern, and the first and second sub-sensors may include first and second sub-sensor patterns, the boundary may include a boundary line extending along the second direction generally perpendicular to the first sensing region and the second sensing region, and the first sub-sensor pattern and the second sub-sensor pattern may have a substantially symmetrical structure with respect to the boundary line.

The first sub-sensor pattern may include a first sub-electrode located in the first sensing region, a second sub-electrode located in the second sensing region, and a first part connecting the first and second sub-electrodes, and the second sub-sensor pattern may include a third sub-electrode located in the second sensing region, a fourth sub-electrode located in the first sensing region, and a second part connecting the third and fourth sub-electrodes.

The first sub-electrode and the fourth sub-electrode may be spaced apart from each other in the first sensing region, and the second sub-electrode and the third sub-electrode may be spaced apart from each other in the second sensing region, wherein each of the first and second parts may be located at the boundary line between the first sensing region and the second sensing region.

The first part may include a first protrusion part integral with at least one of the first and second sub-electrodes, and the second part may include a second protrusion part integral with at least one of the third and fourth sub-electrodes.

The first sub-electrode may have substantially the same size as the third sub-electrode, the second sub-electrode may have substantially the same size as the fourth sub-electrode, and the first protrusion part may have substantially the same size as the second protrusion part.

Each of the first to fourth sub-electrodes may include branch electrodes, wherein at least one of the branch electrodes of the second sub-electrode may be inserted into a groove between the branch electrodes of the third sub-electrode, and at least one of the branch electrodes of the fourth sub-electrode may be inserted into a groove between the branch electrodes of the first sub-electrode.

The branch electrodes of the first sub-electrode and the branch electrodes of the fourth sub-electrode may be alternately disposed in the first sensing region, and the branch electrodes of the second sub-electrode and the branch electrodes of the third sub-electrode may be alternately disposed in the second sensing region.

The first sub-sensor pattern may have a shape converging toward the center of the third sensor pattern and extending back and forth between the first sensing region and the second sensing region, and the second sub-sensor pattern may have a shape converging toward the center of the third sensor pattern and extending back and forth between the second sensing region and the first sensing region.

A first pad unit may be disposed in the non-sensing region, the first pad unit being electrically connected to the first and second sensor patterns of the first sensing region; and a second pad unit may be disposed in the non-sensing region, the second pad unit being electrically connected to the first and second sensor patterns of the second sensing region.

The first pad unit and the second pad unit may be electrically connected to different touch drivers, wherein the first sub-sensor pattern may be electrically connected to the first pad unit, and the second sub-sensor pattern may be electrically connected to the second pad unit.

The first sensing region may include first and second sub-sensing regions adjacent to each other in the first direction, and the second sensing region may include third and fourth sub-sensing regions adjacent to each other in the first direction, wherein the touch sensor may further include at least one fourth sub-sensor disposed between the first and second sub-sensing regions and between the third and fourth sub-sensing regions, and the at least one third sensor may include a third sensor pattern disposed between the first sub-sensing region and the third sub-sensing region and between the second sub-sensing region and the fourth sub-sensing region.

The third sensor pattern may include (3-1)th and (3-2)th sub-sensor patterns spaced apart from each other at a boundary between the first sub-sensing region and the third sub-sensing region and a boundary between the second sub-sensing region and the fourth sub-sensing region, and the at least one fourth sensor may include a fourth sensor pattern includes (4-1)th and (4-2)th sub-sensor patterns spaced apart from each other at a boundary between the first sub-sensing region and the second sub-sensing region and a boundary between the third sub-sensing region and the fourth sub-sensing region.

The (3-1)th sub-sensor pattern and the (3-2)th sub-sensor pattern may have substantially the same size, and the (4-1)th sub-sensor pattern and the (4-2)th sub-sensor pattern may have substantially the same size.

The (3-1)th sub-sensor pattern and the (3-2)th sub-sensor pattern may have a substantially symmetrical structure with respect to a first boundary line extending along the second direction between the first sub-sensing region and the second sub-sensing region and between the third sub-sensing region and the fourth sub-sensing region, and the (4-1)th sub-sensor pattern and the (4-2)th sub-sensor pattern may have a substantially symmetrical structure with respect to a second boundary line extending along the first direction between the first sub-sensing region and the second sub-sensing region and between the third sub-sensing region and the fourth sub-sensing region.

The (3-1)th sub-sensor pattern may include a first sub-electrode located in each of the first sub-sensing region and the second sub-sensing region, a second sub-electrode located in each of the third sub-sensing region and the fourth sub-sensing region, and a first part connecting the first sub-electrode and the second sub-electrode, the (3-2)th sub-sensor pattern may include a third sub-electrode located in each of the third sub-sensing region and the fourth sub-sensing region, a fourth sub-electrode located in each of the first sub-sensing region and the second sub-sensing region, and a second part connecting the third sub-electrode and the fourth sub-electrode, the (4-1)th sub-sensor pattern may include a fifth sub-electrode located in each of the first sub-sensing region and the third sub-sensing region, a sixth sub-electrode located in each of the second sub-sensing region and the fourth sub-sensing region, and a third part connecting the fifth sub-electrode and the sixth sub-electrode, and the (4-2)th sub-sensor pattern may include a seventh sub-electrode located in each of the second sub-sensing region and the fourth sub-sensing region, an eighth sub-electrode located in each of the first sub-sensing region and the third sub-sensing region, and a fourth part connecting the seventh sub-electrode and the eighth sub-electrode.

A first pad unit may be disposed in the non-sensing region, the first pad unit being electrically connected to the first and second sensor patterns of the first sub-sensing region; a second pad unit may be disposed in the non-sensing region, the second pad unit being electrically connected to the first and second sensor patterns of the second sub-sensing region; a third pad unit may be disposed in the non-sensing region, the third pad unit being electrically connected to the first and second sensor patterns of the third sub-sensing region; and a fourth pad unit may be disposed in the non-sensing region, the fourth pad unit being electrically connected to the first and second sensor patterns of the fourth sub-sensing region.

According to another aspect of the invention, a display device includes: a display panel to display an image; and a touch sensor disposed on the display panel, wherein the touch sensor includes: a base layer including first and second sensing regions adjacent to each other in a first direction and a non-sensing region surrounding at least one side of each of the first and second sensing regions; first sensors disposed in each of the first and second sensing regions, the first sensors being arranged along the first direction, the first sensors being electrically connected to each other along the first direction; second sensors disposed in each of the first and second sensing regions, the second sensors being arranged along a second direction, the second sensors being electrically connected to each other along the second direction; and at least one third sensor located in the first sensing region and the second sensing region, wherein the third sensor includes first and second sub-sensor patterns spaced apart from each other at a boundary between the first sensing region and the second sensing region, and the first and second sensors have substantially the same size.

The first sub-sensor pattern and the second sub-sensor pattern may have a substantially symmetrical structure with respect to the boundary which may include a boundary line extending along the second direction intersecting the first direction between the first sensing region and the second sensing region; and the first sensors may include first sensor patterns, the second sensors may include second sensor patterns, and the at least one third sensor may include a third sensor pattern.

The display panel may include: a substrate for a display region to display an image and a non-display region disposed at least one side of the display region; a pixel circuit layer disposed on the substrate, the pixel circuit layer including at least one transistor; a display element layer disposed on the pixel circuit layer, the display element layer including at least one light emitting device emitting light; and an encapsulation layer disposed on the display element layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 7C is an enlarged plan view schematically illustrating an exemplary embodiment of the portion EA3 of FIG. 7A.

DETAILED DESCRIPTION

Figure 1:
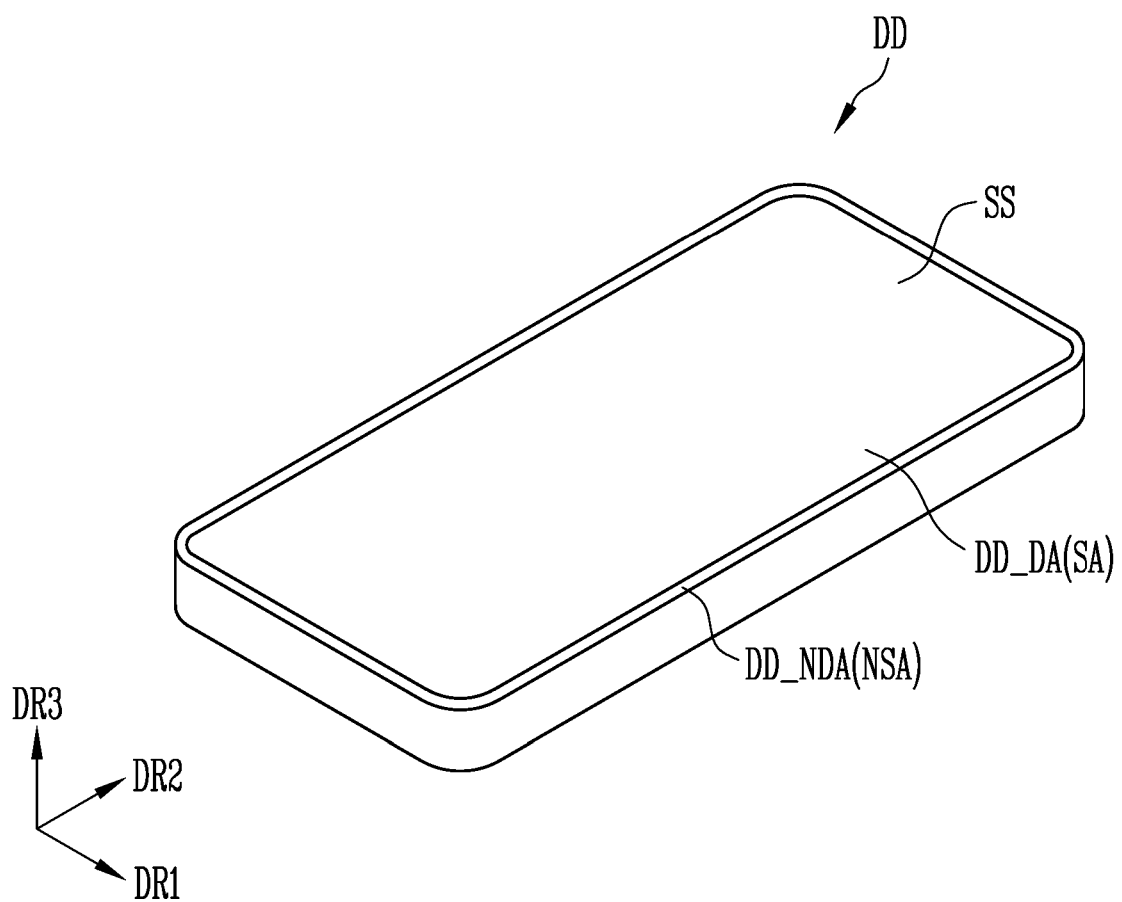
FIG. 1 is a perspective view of an exemplary embodiment of a display device constructed according to principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. Similarly, an expression that an element such as a layer, region, substrate or plate is placed "above" another element indicates not only a case where the element is placed "just above" the other element but also a case where a further element is interposed between the element and the other element. Likewise, an expression that an element such as a layer, region, substrate or plate is placed "beneath" or "below" another element indicates not only a case where the element is placed "directly beneath" or "just below" the other element but also a case where a further element is interposed between the element and the other element.

To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As used herein, "symmetrical" means that an object is made up of exactly similar parts facing each other or around an axis. When two figures are symmetrical, they have substantially the same size and shape, with one figure having a different orientation from the first.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
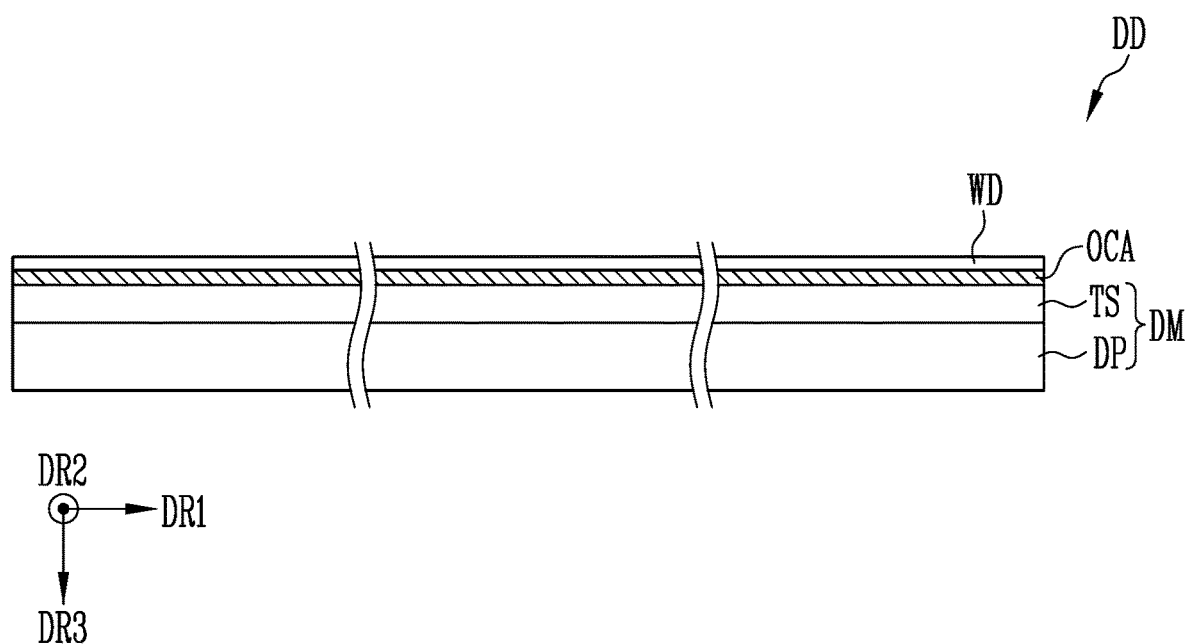
FIG. 2 is a schematic cross-sectional view of the display device of FIG. 1.

FIG. 1 is a perspective view of an exemplary embodiment of a display device constructed according to principles of the invention. FIG. 2 is a schematic cross-sectional view of the display device of FIG. 1.

Referring to FIGS. 1 and 2, the display device DD may include a display module DM and a window WD.

The display device DD may be provided in various shapes. In some exemplary embodiments, the display device DD may be provided in a generally rectangular plate shape having two pairs of sides generally parallel to each other, but some exemplary embodiments are not limited thereto. When the display device DD is provided in the generally rectangular plate shape, any one pair of sides among the two pairs of sides may be provided longer than the other pair of sides. In some exemplary embodiments, a case where the display device DD is provided in a substantially rectangular shape having a pair of long sides and a pair of short sides is illustrated for convenience of description. An extending direction of the long sides is represented as a second direction DR2, an extending direction of the short sides is represented as a first direction DR1, and a direction substantially perpendicular to the extending directions of the long sides and the short sides is represented as a third direction DR3. As described above, in the display device DD provided in the substantially rectangular plate shape, a corner portion at which one long side and one short side are in contact with each other may have a generally round shape.

According to an exemplary embodiment, at least a portion of the display device DD may have flexibility, and the display device DD may be folded at a portion having flexibility.

The display device DD may include a display region DD_DA for displaying an image and a non-display region DD NDA provided at least one side SS of the display region DD_DA. The non-display region DD NAD is a region in which the image is not displayed.

In some exemplary embodiments, the display device DD may include a sensing to region SA and a non-sensing region NSA. The display device DD may not only display an image through the sensing region SA but also sense light incident from the front thereof. The non-sensing region NSA may surround the sensing region SA. However, this is merely illustrative, and the exemplary embodiments are not limited thereto. Although an example where the sensing region SA has a shape including a generally round-shaped corner and corresponds to the display region DD_DA is illustrated in FIG. 1, the exemplary embodiments are not limited thereto. In some exemplary embodiments, a partial region of the display region DD_DA may correspond to the sensing region SA. The shape, size, and arrangement position of the sensing region SA of the display device DD may be variously modified according to sensor patterns, which will be described later.

The display module DM may include a display panel DP and a touch sensor TS. The touch sensor TS may be directly disposed on the display panel DP, or be disposed on the display panel DP with a separate layer such as an adhesive layer (or bonding layer) or a substrate, which is interposed therebetween.

The display panel DP may display an image. Self-luminescent display panels such as an organic light emitting display panel (OLED panel) may be used as the display panel DP. However, the exemplary embodiments are not limited thereto, and in other exemplary embodiments, non-luminescent display panels, such as a liquid crystal display panel (LCD panel), an electrophoretic display panel (EPD panel), an electro-wetting display panel (EWD panel), and other types may be used as the display panel DP. When a non-luminescent display panel is used as the display panel DP, the display device DD may have a backlight unit for supplying light to the display panel DP.

The touch sensor TS may be disposed on a surface from which an image of the display panel DP is emitted, to receive a touch input of a user. The touch sensor TS may recognize a touch event of the display device DD through a hand of a user or a separate input means. The touch sensor TS may recognize a touch event by using a capacitive method. However, the exemplary embodiments are not limited thereto, and in other exemplary embodiments, the touch sensor TS may detect the touch input in a mutual capacitance manner or in a self-capacitance manner.

The window WD for protecting an exposed surface of the display module DM may be provided on the display module DM. The window WD may protect the display module DM from external impact, and provide an input surface and/or a display surface to a user. The window WD may be coupled to the display module DM by using an Optically Clear Adhesive (OCA) member.

The window WD may have a multi-layered structure, and may include at least one of a glass substrate, a plastic film, and a plastic substrate. The multi-layered structure may be formed through a continuous process or an attachment process using an adhesive layer (or bonding layer). The whole or a portion of the window WD may have flexibility.

Figure 3:
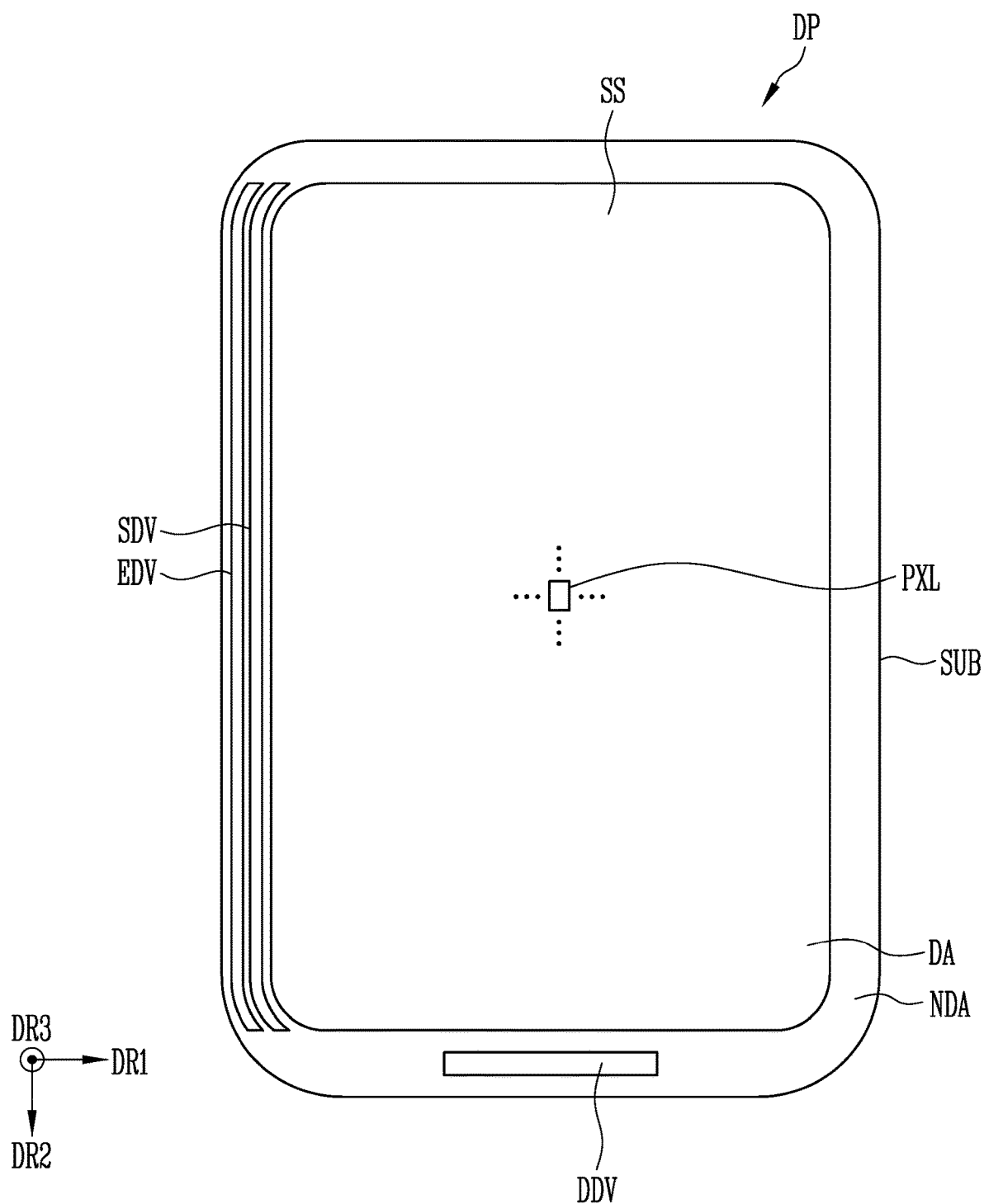
FIG. 3 is a plan view schematically illustrating the display panel of FIG. 2.

FIG. 3 is a plan view schematically illustrating the display panel of FIG. 2.

Referring to FIGS. 1 to 3, the display panel DP may include a substrate SUB, pixels PXL provided on the substrate SUB, a drive unit provided on the substrate SUB, the drive unit driving the pixels PXL, and a line unit connecting the pixels PXL and the drive unit.

The substrate SUB may be provided as one region having a generally rectangular shape. However, a number of regions provided in the substrate SUB may be different therefrom, and the shape of the substrate SUB may be changed depending on a region provided in the substrate SUB.

The substrate SUB may include an insulative material, such as a glass or a resin. Also, the substrate SUB may include a material having flexibility to be bendable or foldable, and have a single- or multi-layered structure. For example, the material having flexibility may include at least one of a polystyrene, a polyvinyl alcohol, a polymethyl methacrylate, a polyethersulfone, a polyacrylate, a polyetherimide, a polyethylene naphthalate, a polyethylene terephthalate, a polyphenylene sulfide, a polyarylate, a polyimide, a polycarbonate, a triacetate cellulose, a cellulose acetate propionate, and the like. However, the material forming the substrate SUB may be variously changed. For example, in some exemplary embodiments, the substrate SUB and include a fiber reinforced plastic (FRP), etc.

The substrate SUB may include a display region DA and a non-display region NDA. The display region DA may be a region provided with the pixels PXL to display an image, and the non-display region NDA is a region in which the pixels PXL are not provided. The non-display region NDA may be a region in which the image is not displayed. For convenience of description, only one representative pixel PXL is illustrated in FIG. 3, but a plurality of pixels PXL may be substantially arranged in the display region DA of the substrate SUB.

The display region DA of the display panel DP may correspond to the display region DD_DA of the display device DD, and the non-display region NDA of the display panel DP may correspond to the non-display region DD NDA of the display device DD.

The non-display region NDA may be provided with the drive unit for driving the pixels PXL and at least some lines connecting the pixels PXL and the drive unit. The non-display region NDA may correspond to a generally bezel region of the display device DD.

The pixels PXL may be provided in the display region DA of the substrate SUB. Each of the pixels PXL may be a minimum unit to display an image. Each of the pixels PXL may include an organic light emitting device emitting white light and/or colored light. Each of the pixels PXL may emit any one color among red, green, and blue. However, the exemplary embodiments are not limited thereto, and in other exemplary embodiments, the pixel PXL may emit light of a color such as cyan, magenta or yellow.

The pixels PXL may be arranged in a matrix form along rows extending in a first direction DR1 and columns extending in a second direction DR2 intersecting the first direction DR1. However, the arrangement form of the pixels PXL is not particularly limited, and the pixels PXL may be arranged in various forms.

The drive unit provides signals to each of the pixels PXL through the line unit, and controls driving of the pixels PXL. For convenience of description, the line unit is omitted in FIG. 3 to avoid redundancy.

The drive unit may include a scan driver SDV for transferring a scan signal to each of the pixels PXL along a scan line, an emission driver EDV for providing an emission control signal to each of the pixels PXL along an emission control line, a data driver DDV for providing a data signal to each of the pixels PXL along a data line, and a timing controller. The timing controller controls the scan driver SDV, the emission driver EDV, and the data driver DDV.

Figure 4A:
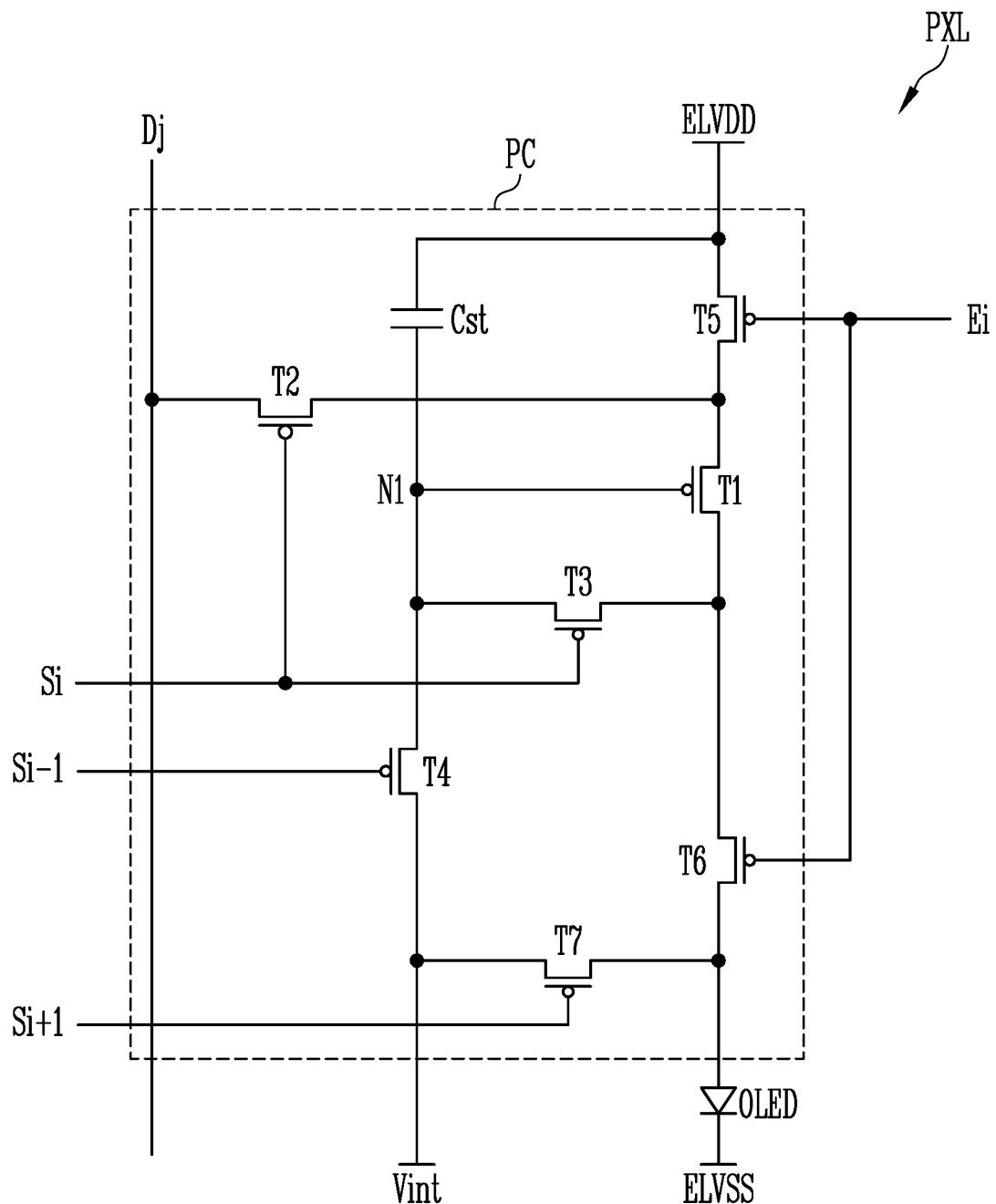
FIG. 4A is an equivalent circuit diagram illustrating an electrical connection relationship of components in a representative pixel of FIG. 3.

FIG. 4A is an equivalent circuit diagram illustrating an electrical connection relationship of components in a representative pixel of FIG. 3. Referring to FIGS. 1A to 4A, each of the pixels PXL may include a light emitting element OLED and a pixel circuit PC for driving the light emitting element OLED. According to some exemplary embodiments, the light emitting element OLED may be an organic light emitting diode.

The pixel circuit PC may be connected to a scan line Si and a data line Dj of a corresponding pixel PXL. In an example, when a pixel PXL is disposed on an ith (i is a natural number) row and a jth (j is a natural number) column of the display region DA of the display panel DP, the pixel circuit PC of the pixel PXL may be connected to an ith scan line Si and a jth data line Dj of the display region DA. In some exemplary embodiments, the pixel circuit PC may be further connected to at least another scan line. For example, one pixel PXL disposed on the ith row of the display region DA may be further connected to an (i−1)th scan line Si−1 and/or an (i+1)th scan line Si+1. In some exemplary embodiments, the pixel circuit PC may be further connected to a third power source in addition to first and second pixel power sources ELVDD and ELVSS. For example, the pixel circuit PC may also be connected to an initialization power source Vint.

The pixel circuit PC may include first to seventh transistors T1 to T7 and a storage capacitor Cst. One electrode, e.g., a source electrode of the first transistor T1 (driving transistor) may be connected to a power line to which a first pixel power source ELVDD is applied via the fifth transistor T5, and another electrode, e.g., a drain electrode of the first transistor T1 may be connected to the light emitting element OLED via the sixth transistor T6. In addition, a gate electrode of the first transistor T1 may be connected to a first node N1. The first transistor T1 controls a driving current flowing between the first pixel power source ELVDD and a second pixel power source ELVSS via the light emitting element OLED, corresponding to a voltage of the first node N1.

The second transistor T2 (switching transistor) may be connected between the jth data line Dj connected to the pixel PXL and the source electrode of the first transistor T1. In addition, a gate electrode of the second transistor T2 may be connected to the ith scan line Si connected to the pixel PXL. The second transistor T2 may be turned on when a scan signal having a gate-on voltage (e.g., a low voltage) is supplied from the ith scan line Si, to electrically connect the jth data line Dj to the source electrode of the first transistor T1. Therefore, when the second transistor T2 is turned on, a data signal supplied from the jth data line Dj is transferred to the first transistor T1.

The third transistor T3 may be connected between the drain electrode of the first transistor T1 and the first node N1. In addition, a gate electrode of the third transistor T3 may be connected to the ith scan line Si. The third transistor T3 may be turned on when a scan signal having a gate-on voltage is supplied from the ith scan line Si, to electrically connect the drain electrode of the first transistor T1 and the first node N1.

The fourth transistor T4 may be connected between the first node N1 and an initialization power line to which the initialization power source Vint is applied. In addition, a gate electrode of the fourth transistor T4 may be connected to a previous scan line, e.g., the (i−1)th scan line Si−1. The fourth transistor T4 may be turned on when a scan signal having a gate-on voltage is supplied from the (i−1)th scan line Si−1, to transfer a voltage of the initialization power source Vint to the first node N1. The initialization power source Vint may have a voltage equal to or smaller than the lowest voltage of the data signal.

The fifth transistor T5 may be connected between the first pixel power source ELVDD and the first transistor T1. In addition, a gate electrode of the fifth transistor T5 may be connected to a corresponding emission control line, e.g., an ith emission control line Ei. The fifth transistor T5 may be turned off when an emission control signal having a gate-off voltage is supplied from the ith emission control line Ei, and be turned on in other cases.

The sixth transistor T6 may be connected between the first transistor T1 and the light emitting element OLED. In addition, a gate electrode of the sixth transistor T6 may be connected to the ith emission control line Ei. The sixth transistor T6 may be turned off when an emission control signal having a gate-off voltage is supplied from the ith emission control line Ei, and be turned on in other cases.

The seventh transistor T7 may be connected between the light emitting element OLED and the initialization power line to which the initialization power source Vint is applied. In addition, a gate electrode of the seventh transistor T7 may be connected to any one of scan lines of a next stage, e.g., the (i+1)th scan line Si+1. The seventh transistor T7 may be turned on when a scan signal having a gate-on voltage is supplied from the (i+1)th scan line Si+1, to supply the voltage of the initialization power source Vint to the light emitting element OLED.

The storage capacitor Cst may be connected between the first pixel power source ELVDD and the first node N1. The storage capacitor Cst may store a data signal supplied to the first node in each frame period and a threshold voltage of the first transistor T1.

An anode electrode of the light emitting element OLED may be connected to the first transistor T1 via the sixth transistor T6, and a cathode electrode of the light emitting element OLED may be connected to the second pixel power source ELVSS. The light emitting element OLED may generate light with a predetermined luminance corresponding to the amount of current supplied from the first transistor T1. The first pixel power source ELVDD may be set to have a voltage higher than that of the second pixel power source ELVSS such that current can flow through the light emitting element OLED. The potential difference between the first pixel power source ELVDD and the second pixel power source ELVSS may be set to a threshold voltage or more of the light emitting element OLED during an emission period.

Figure 4B:
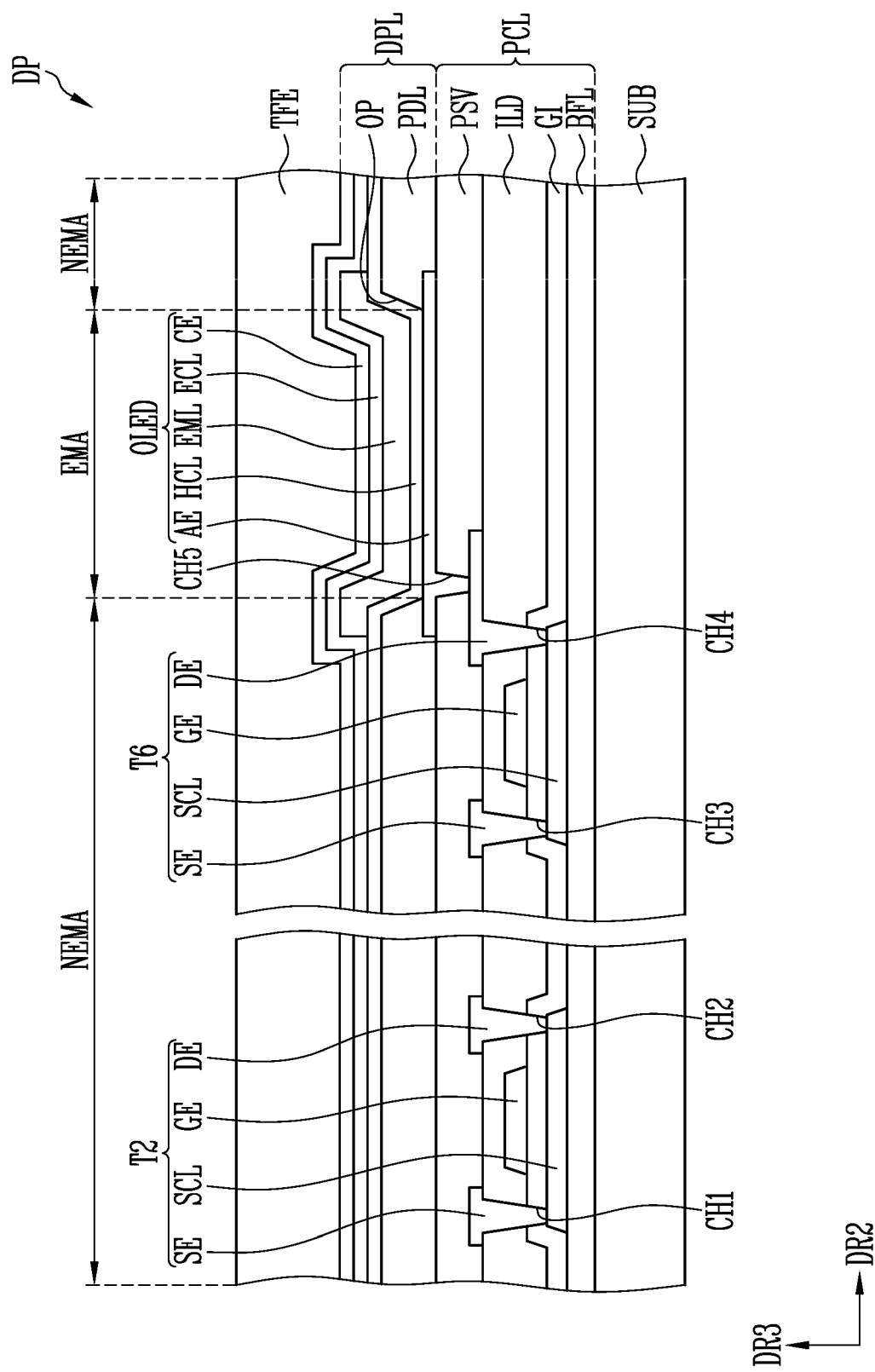
FIG. 4B is an enlarged cross-sectional view of a portion of the display panel of FIG. 3.

FIG. 4B is an enlarged cross-sectional view of a portion of the display panel of FIG. 3.

In FIG. 4B, only a section of a portion corresponding to each of the second and sixth transistors among the first to seventh transistors shown in FIG. 4A is illustrated for convenience of description.

Referring to FIGS. 1 to 4B, the display panel DP may include the substrate SUB, a pixel circuit layer PCL, a display element layer DPL, and a thin film encapsulation layer TFE.

The substrate SUB may include an insulative material such as a glass, an organic polymer or a quartz. Also, the substrate SUB may be made of a material having flexibility to be bendable or foldable, and have a single- or multi-layered structure.

The pixel circuit layer PCL may include a buffer layer BFL, the second and sixth transistors T2 and T6, and a protective layer PSV.

The buffer layer BFL may be provided on the substrate SUB, and prevent an impurity from being diffused into the second and sixth transistors T2 and T6. The buffer layer BFL may be provided in a single layer, but be provided in a multi-layer including at least two layers. The buffer layer BFL may be omitted according to the material and process conditions of the substrate SUB.

Each of the second and sixth transistors T2 and T6 may include a semiconductor layer SCL, a gate electrode GE, a source electrode SE, and a drain electrode DE.

The semiconductor layer SCL of each of the second and sixth transistors T2 and T6 may be provided on the buffer layer BFL. The semiconductor layer SCL may include source and drain regions respectively in contact with the source electrode SE and the drain electrode DE. A region between the source region and the drain region may be a channel region.

The semiconductor layer SCL may be a semiconductor pattern made of a poly-silicon, an amorphous silicon, an oxide semiconductor, etc. The channel region is an intrinsic semiconductor pattern undoped with an impurity. The impurity may include impurities such as an n-type impurity, a p-type impurity, and other metals. Each of the source and drain regions may be a semiconductor pattern doped with the impurity.

The gate electrode GE of each of the second and sixth transistors T2 and T6 may be provided on a corresponding semiconductor layer SCL with a gate insulating layer GI interposed therebetween.

The source electrode SE of each of the second and sixth transistors T2 and T6 may be in contact with the source region of a corresponding semiconductor layer SCL through a contact hole penetrating an interlayer insulating layer ILD and the gate insulating layer GI. In some exemplary embodiments, the source electrode SE of the second transistor T2 may be in contact with the source region of a corresponding semiconductor layer SCL through a first contact hole CH1 penetrating the interlayer insulating layer ILD and the gate insulating layer GI, and the source electrode SE of the sixth transistor T6 may be in contact with the source region of a corresponding semiconductor layer SCL through a third contact hole CH3 penetrating the interlayer insulating layer ILD and the gate insulating layer GI.

The drain electrode DE of each of the second and sixth transistors T2 and T6 may be in contact with the drain region of a corresponding semiconductor layer SCL through a contact hole penetrating the interlayer insulating layer ILD and the gate insulating layer GI. In some exemplary embodiments, the drain electrode DE of the second transistor T2 may be in contact with the drain region of a corresponding semiconductor layer SCL through a second contact hole CH2 penetrating the interlayer insulating layer ILD and the gate insulating layer GI, and the drain electrode DE of the sixth transistor T6 may be in contact with the drain region of a corresponding semiconductor layer SCL through a fourth contact hole CH4 penetrating the interlayer insulating layer ILD and the gate insulating layer GI.

In some exemplary embodiments, each of the interlayer insulating layer ILD and the gate insulating layer GI may be configured with an inorganic insulating layer including an inorganic material or an organic insulating layer including an organic material.

The protective layer PSV may be provided over the second and sixth transistors T2 and T6 to cover the second and sixth transistors T2 and T6. The protective layer PSV may include a fifth contact hole CH5 through which a portion of the drain electrode DE of the sixth transistor T6 is exposed to the outside.

The display element layer DPL may include a light emitting element OLED provided on the protective layer PSV, the light emitting element OLED emitting light.

The light emitting element OLED may include first and second electrodes AE and CE and an emitting layer EML provided between the two electrodes AE and CE. Any one of the first and second electrodes AE and CE may be an anode electrode, and the other of the first and second electrodes AE and CE may be a cathode electrode. For example, the first electrode AE may be the anode electrode, and the second electrode CE may be the cathode electrode. When the light emitting element OLED is a top-emission organic light emitting device, the first electrode AE may be a reflective electrode, and the second electrode CE may be a transmissive electrode. In the illustrated exemplary embodiment, a case where the light emitting element OLED is the top-emission organic light emitting device, and the first electrode AE is the anode electrode is described as an example.

The first electrode AE may be electrically connected to the drain electrode DE of the sixth transistor T6 through the fifth contact hole CH5 penetrating the protective layer PSV. The first electrode AE may include a reflective layer capable of reflecting light and a transparent conductive layer disposed on the top or bottom of the reflective layer. At least one of the transparent conductive layer and the reflective layer may be electrically connected to the drain electrode DE of the sixth transistor T6.

The display element layer DPL may further include a pixel defining layer PDL having an opening OP through which a portion of the first electrode AE, e.g., an upper surface of the first electrode AE is exposed.

Each pixel PXL provided in the display panel DP may be disposed in a pixel region included in the display region DA. The pixel region may include an emission region EMA and a non-emission region NEMA adjacent to the emission region EMA. The non-emission region NEMA may surround the emission region EMA. The emission region EMA may be defined corresponding to a partial region of the first electrode AE, which is exposed by the opening OP.

The display element layer DPL may include a hole control layer HCL and an electron control layer ECL. The hole control layer HCL may be commonly disposed in the emission region EMA and the non-emission region NEMA.

A common layer such as the hole control layer HCL may be formed in a plurality of pixels PXL.

The emitting layer EML is disposed on the hole control layer HCL. The emitting layer EML may be disposed in a region corresponding to the opening OP. That is, the emitting layer EML may be separated to be respectively provided in a plurality of pixels PXL. The emitting layer EML may include an organic material and/or an inorganic material. In the illustrated embodiment, a patterned emitting layer EML is exemplarily illustrated. However, in some exemplary embodiments, the emitting layer EML may be commonly provided in the pixels PXL. The color of light generated in the emitting layer EML may be one of red, green, blue, and white, but the exemplary embodiments are not limited thereto. For example, the color of light generated in the emitting layer EML may be one of magenta, cyan, and yellow.

The electron control layer ECL may be provided on the emitting layer EML. The electron control layer ECL may be commonly formed in the pixels PXL, and function to inject and/or transport electrons into the emitting layer EML. The second electrode CE may be provided on the electron control layer ECL. The second electrode CE may be commonly provided in the pixels PXL. The thin film encapsulation layer TFE covering the second electrode CE may be provided over the second electrode CE.

The thin film encapsulation layer TFE may be provided in a single layer, but be provided in a multi-layer. The thin film encapsulation layer TFE may include a plurality of insulating layers covering the light emitting element OLED. Specifically, the thin film encapsulation layer TFE may include at least one inorganic layer and at least one organic layer. For example, the thin film encapsulation layer TFE may have a structure in which the inorganic and organic layers are alternately stacked. In some exemplary embodiments, the thin film encapsulation layer TFE may be an encapsulation substrate which is disposed over the light emitting element OLED and is joined with the substrate through a sealant.

Figure 5:
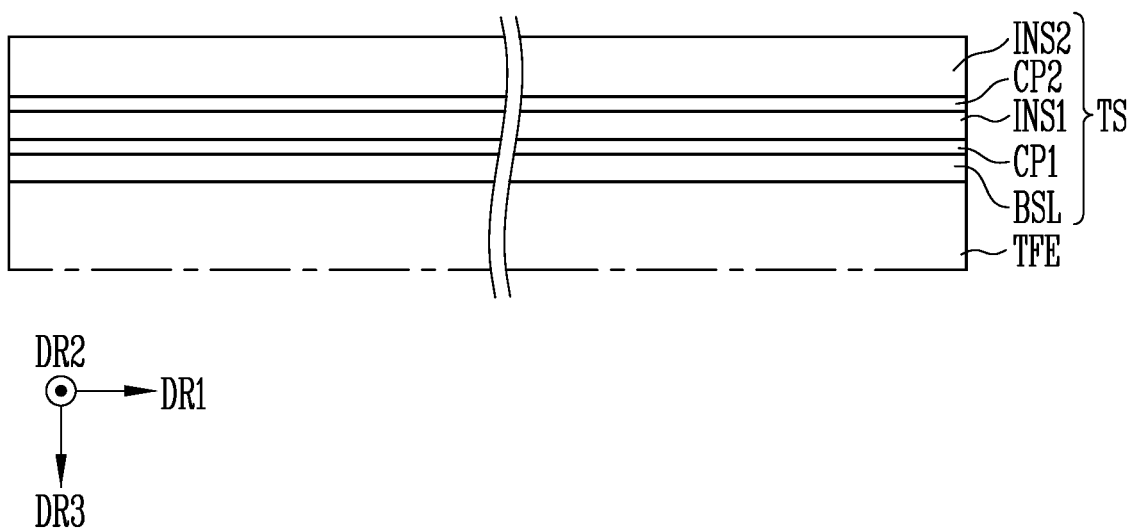
FIG. 5 is a schematic cross-sectional view of the touch sensor of FIG. 2.

FIG. 5 is a schematic cross-sectional view of the touch sensor of FIG. 2.

Referring to FIGS. 1 to 5, the touch sensor TS may include a base layer BSL, a first conductive pattern CP1, a first insulating layer INS1, a second conductive pattern CP2, and a second insulating layer INS2.

The first conductive pattern CP1 may be directly disposed on the thin film encapsulation layer TFE of the display panel DP, but the exemplary embodiments are not limited thereto. In some exemplary embodiments, another insulating layer, e.g., the base layer BSL may be disposed between the first conductive pattern CP1 and the thin film encapsulation layer TFE. The first conductive pattern CP1 may be directly disposed on the base layer BSL.

Each of the first and second conductive patterns CP1 and CP2 may have a single-layered structure, or have a multi-layered structure in which layers are stacked in the thickness direction thereof. The conductive pattern having the single-layered structure may include a metal layer or a transparent conductive layer. The metal layer may include molybdenum, silver, titanium, copper, aluminum, and alloys thereof. The transparent conductive layer may include a transparent conductive oxide such as indium tin oxide (ITO), indium zinc oxide (IZO), zinc oxide (ZnO), or indium tin zinc oxide (ITZO). In addition, the transparent conductive layer may include a poly(3,4-ethylenedioxythiophene) (PEDOT), a metal nano wire, and a graphene.

The conductive pattern having the multi-layered structure may include multi-layered metal layers. The multi-layered metal layers may have, for example, a triple layered structure of titanium/aluminum/titanium. The conductive pattern having the multi-layered structure may include a single-layered metal layer and a transparent conductive layer. The conductive pattern having the multi-layered structure may include multi-layered metal layers and a transparent conductive layer.

In some exemplary embodiments, each of the first and second conductive patterns CP1 and CP2 may include sensor patterns and sensing lines. Each of the first insulating layer INS1 and the second insulating layer INS2 may include an inorganic insulating layer including an inorganic material or an organic insulating layer including an organic material. The inorganic insulating layer may include at least one of an aluminum oxide, a titanium oxide, a silicon oxide or a silicon nitride, a silicon oxynitride, a zirconium oxide, and a hafnium oxide. The organic insulating layer may include at least one of an acryl-based resin, a methacryl-based resin, a polyisoprene, a vinyl-based resin, an epoxy-based resin, an urethane-based resin, a cellulose-based resin, a siloxane-based resin, a polyimide-based resin, a poly-amide-based resin, and a perylene-based resin.

Figure 6:
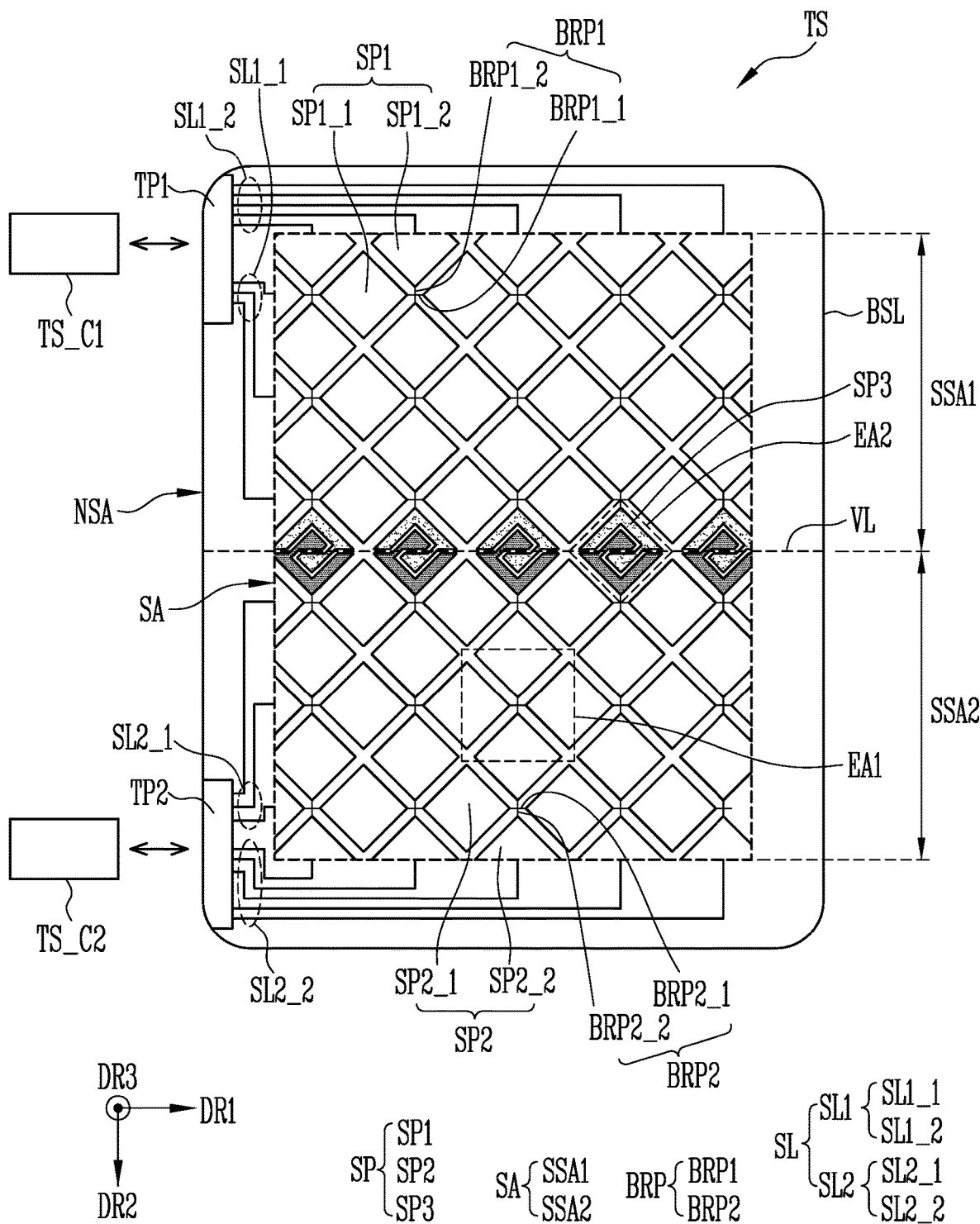
FIG. 6 is a schematic plan view of an exemplary embodiment of the touch sensor of FIG. 2.
Figure 7A:
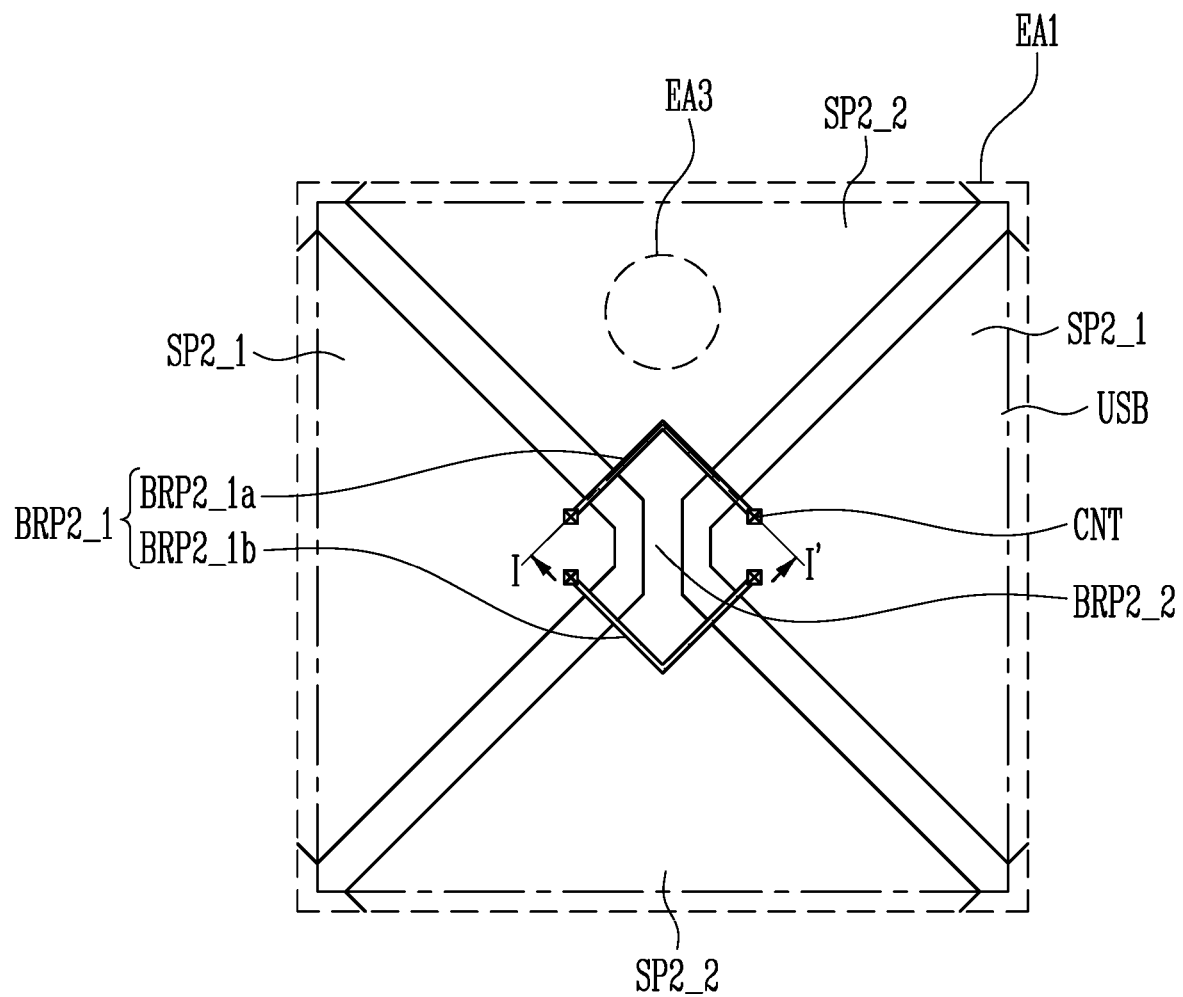
FIG. 7A is an enlarged plan view schematically illustrating an exemplary embodiment of the portion EA1 of FIG. 6.
Figure 7A:
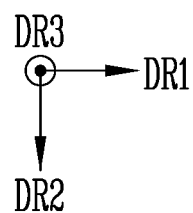
Figure 7B:
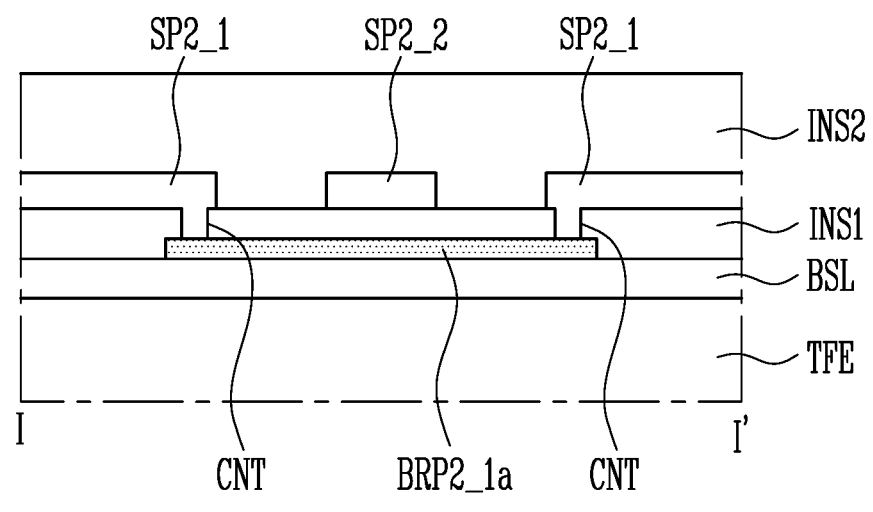
FIG. 7B is a cross-sectional view taken along line I-I' of FIG. 7A.
Figure 7B:
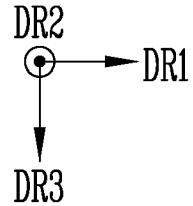
Figure 8:
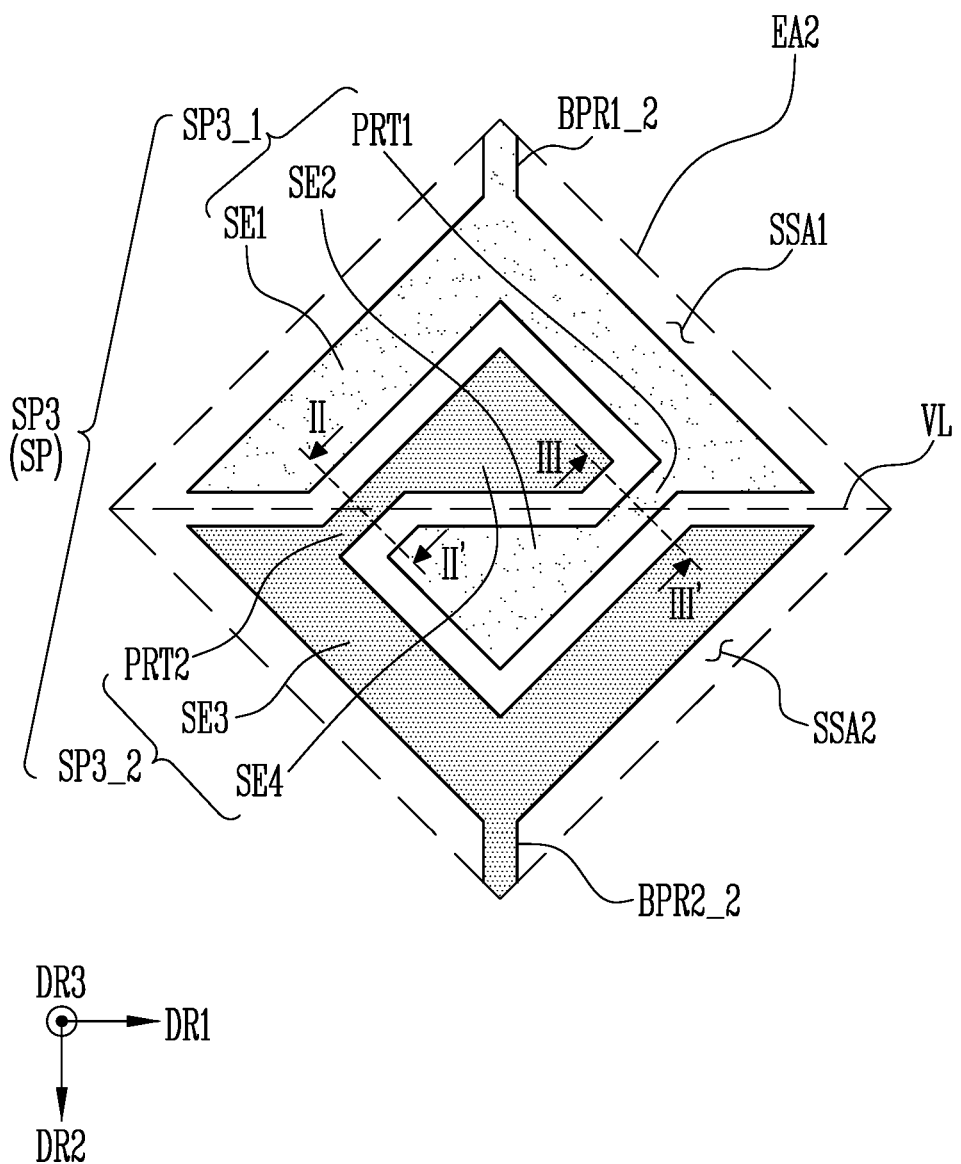
FIG. 8 is an enlarged plan view schematically illustrating an exemplary embodiment of the portion EA2 of FIG. 6.
Figure 9A:
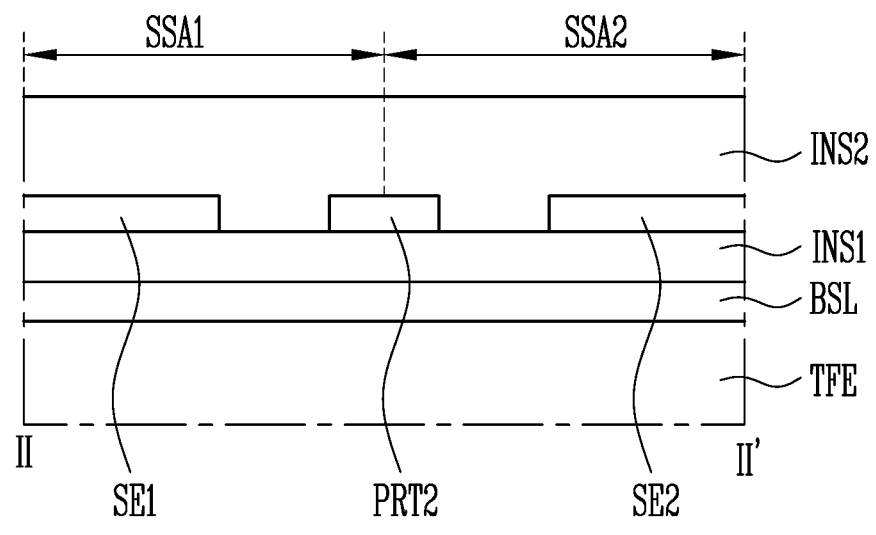
FIG. 9A is a cross-sectional view taken along line II-II' of FIG. 8.
Figure 9A:
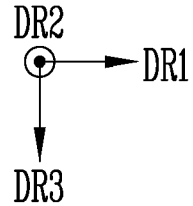
Figure 9B:
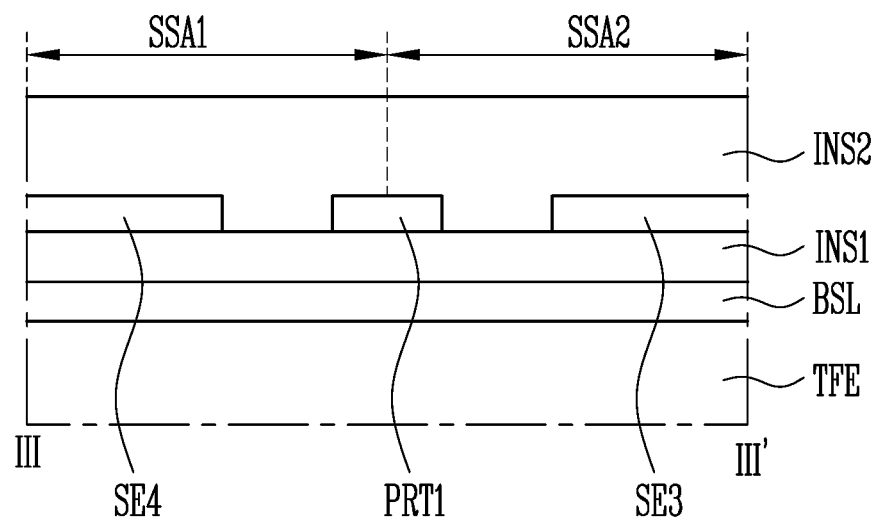
FIG. 9B is a cross-sectional view taken along line III-III' of FIG. 8.
Figure 9B:
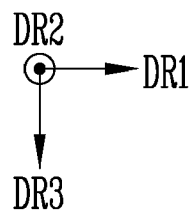

FIG. 6 is a schematic plan view of an exemplary embodiment of the touch sensor of FIG. 2. FIG. 7A is an enlarged plan view schematically illustrating an exemplary embodiment of the portion EA1 of FIG. 6. FIG. 7B is a cross-sectional view taken along line I-I' of FIG. 7A. FIG. 7C is an enlarged plan view schematically illustrating an exemplary embodiment of the portion EA3 of FIG. 7A. FIG. 8 is an enlarged plan view schematically illustrating an exemplary embodiment of the portion EA2 of FIG. 6. FIG. 9A is a cross-sectional view taken along line II-II' of FIG. 8. FIG. 9B is a cross-sectional view taken along line III-III' of FIG. 8. Referring to FIGS. 1 to 9B, the touch sensor TS may include a base layer BSL including a sensing region SA capable of sensing a touch input and a non-sensing region NSA surrounding at least a portion of the sensing region SA. Also, the touch sensor TS may include first and second touch controllers TS_C1 and TS_C2 for detecting a touch position input to the sensing region SA.

The base layer BSL may be formed of a tempered glass, a transparent plastic, a transparent film, or the like. The sensing region SA may be provided in a central region of the base layer BSL to overlap with the display region DA of the display panel DP. The sensing region SA may be provided in a shape substantially identical to that of the display region DA, but some exemplary embodiments are not limited thereto. A sensor electrode for sensing a touch input may be provided and/or formed in the sensing region SA.

In the illustrated exemplary embodiment, the sensing region SA may include a first sensing region SSA1 and a second sensing region SSA2, which are defined along one direction, e.g., a second direction DR2. The first sensing region SSA1 and the second sensing region SSA2 may be adjacent to each other and have substantially the same area (or size). A sensor electrode may be provided and/or formed in each of the first and second sensing regions SSA1 and SSA2.

The non-sensing region NSA may be provided at an edge of the base layer BSL to overlap with the non-display region NDA of the display panel DP. Sensing lines SL electrically connected to the sensor electrode to receive and transfer a sensing signal may be provided and/or formed in the non-sensing region NSA. In addition, a pad unit connected to the sensing lines SL to be electrically connected to the sensor electrode of the sensing region SA may be disposed in the non-sensing region NSA. In some exemplary embodiments, the pad unit may include a first touch pad unit TP1 electrically connected to the sensor electrode provided and/or formed in the first sensing region SSA1 and a second touch pad unit TP2 electrically connected to the sensor electrode provided and/or formed in the second sensing region SSA2.

The sensor electrode provided and/or formed in the sensing region SA may include a plurality of sensors, which may be in the form of sensor patterns SP, and a bridge pattern BRP. In an example, the sensor electrode provided and/or formed in the first sensing region SSA1 may include first sensor patterns SP1 and a first bridge pattern BRP1, and the sensor electrode provided and/or formed in the second sensing region SSA2 may include second sensor patterns SP2 and a second bridge pattern BRP2. In the illustrated exemplary embodiment, when one sensor pattern among the first and second sensor patterns SP1 and SP2 is arbitrarily designated or when the first and second sensor patterns SP1 and SP2 are inclusively designated, the sensor pattern or the sensor patterns may be referred to as a sensor pattern SP or sensor patterns SP.

The first sensor patterns SP1 may include (1-1)th sensor patterns SP1_1 arranged along a first direction DR1 and (1-2)th sensor patterns SP1_2 arranged along the second direction DR2. The (1-1)th sensor patterns SP1_1 may be electrically connected to adjacent (1-1)th sensor patterns SP1_1 through the first bridge pattern BRP1 to constitute at least one sensor row in the first sensing region SSA1. The (1-2)th sensor patterns SP1_2 may be electrically connected to adjacent (1-2)th sensor patterns SP1_2 through the first bridge pattern BRP1 to constitute at least one sensor column in the first sensing region SSA1.

The second sensor patterns SP2 may include (2-1)th sensor patterns SP2_1 arranged along the first direction DR1 and (2-2)th sensor patterns SP2_2 arranged along the second direction DR2. The (2-1)th sensor patterns SP2_1 may be electrically connected to adjacent (2-1)th sensor patterns SP2_1 through the second bridge pattern BRP2 to constitute at least one sensor row in the second sensing region SSA2. The (2-2)th sensor patterns SP2_2 may be electrically connected to adjacent (2-2)th sensor patterns SP2_2 through the second bridge pattern BRP2 to constitute at least one sensor column in the second sensing region SSA2.

Each of the (1-1)th sensor patterns SP1_1 and the (2-1)th sensor patterns SP2_1 may be a driving electrode receiving a driving signal for detecting a touch position in a corresponding sensing region, and each of the (1-2)th sensor patterns SP1_2 and the (2-2)th sensor patterns SP2_2 may be a sensing electrode outputting a driving signal for detecting a touch position in a corresponding sensing region. However, the exemplary embodiments are not limited thereto. Each of the (1-1)th and (2-1)th sensor patterns SP1_1 and SP2_1 may be a sensing electrode, and each of the (1-2)th and (2-2)th sensor patterns SP1_2 and SP2_2 may be a driving electrode.

The first sensor patterns SP1 may be electrically connected to the first touch pad unit TP1 through a corresponding sensing line SL, and the second sensor patterns SP2 may be electrically connected to the second touch pad unit TP2 through a corresponding sensing line SL. In some exemplary embodiments, the touch sensor TS may recognize a touch of a user by sensing a variation in mutual capacitance formed between adjacent sensor patterns SP in the first and second sensing regions SSA1 and SSA2.

In some exemplary embodiments, each of the (2-2)th sensor patterns SP2_2 may include a plurality of conductive fine lines CFL1 and CFL2 as shown in FIG. 7C. In an example, each of the (2-2)th sensor patterns SP2_2 may include a plurality of first conductive fine lines CFL1 which extend in an oblique direction of the first direction DR1 or the second direction DR2 and are generally parallel to each other and a plurality of second conductive fine lines CFL2 which extend in a third direction DR3 and are generally parallel to each other. Each of the (2-2)th sensor patterns SP2_2 may have a mesh structure due to the first conductive fine lines CFL1 and the second conductive fine lines CFL2. The mesh structure may include a plurality of openings, e.g., regions formed when the first conductive fine lines CFL1 and the second conductive fine lines CFL2 intersect each other.

Although each of the (2-2)th sensor patterns SP2_2 has a mesh structure as in the illustrated exemplary embodiment, the exemplary embodiments are not limited thereto. For example, the (1-1)th, (1-2)th, and (2-1)th sensor patterns SP1_1, SP1_2, and SP2_1 and the first and second bridge patterns BRP1 and BRP2 may also be provided in a mesh structure including the first and second conductive fine lines CFL1 and CFL2.

The first bridge pattern BRP1 may include a (1-1)th bridge pattern BRP1_1 located between two adjacent (1-1)th sensor patterns SP1_1 to electrically connect the (1-1)th sensor patterns SP1_1 and a (1-2)th bridge pattern BRP1_2 located between two adjacent (1-2)th sensor patterns SP1_2 to electrically connect the (1-2)th sensor patterns SP1_2. The (1-1)th bridge pattern BRP1_1 may be provided in a shape extending along the arrangement direction of the (1-1) the sensor patterns SP1_1, e.g., the first direction DR1. The (1-2)th bridge pattern BRP1_2 may be provided in a shape extending along the arrangement direction of the (1-2)th sensor patterns SP1_2, e.g., the second direction DR2.

The second bridge pattern BRP2 may include a (2-1)th bridge pattern BRP2_1 located between two adjacent (2-1)th sensor patterns SP2_1 to electrically connect the (2-1)th sensor patterns SP2_1 and a (2-2)th bridge pattern BRP2_2 located between two adjacent (2-2)th sensor patterns SP2_2 to electrically connect the (2-2)th sensor patterns SP2_2. The (2-1)th bridge pattern BRP1_1 may be provided in a shape extending along the arrangement direction of the (2-1) the sensor patterns SP2_1, e.g., the first direction DR1. The (2-2)th bridge pattern BRP2_2 may be provided in a shape extending along the arrangement direction of the (2-2)th sensor patterns SP2_2, e.g., the second direction DR2.

The (2-1)th bridge pattern BRP2_1 may include a (2-1a)th bridge pattern BRP2_1a and a (2-1b)th bridge pattern BRP2_1b as shown in FIG. 7A. The (1-1)th bridge pattern BRP1_1 may also have substantially the same configuration as the (2-1)th bridge pattern BRP2_1. In some exemplary embodiments, the (1-1)th bridge pattern BRP1_1 may include two bridge patterns provided in a shape extending along the first direction DR1.

The (2-2)th bridge pattern BRP2_2 may be integrally provided with the (2-2)th sensor patterns SP2_2. When the (2-2)th bridge pattern BRP2_2 is integrally provided with the (2-2)th sensor patterns SP2_2, the (2-2)th bridge pattern BRP2_2 may be one region of the (2-2)th sensor patterns SP2_2. The (1-2)th bridge pattern BRP1_2 may also be provided in a shape extending along the second direction DR2, and be integrally provided with the (1-2)th sensor patterns SP1_2. When the (1-2)th bridge pattern BRP1_2 is integrally provided with the (1-2)th sensor patterns SP1_2, the (1-2)th bridge pattern BRP1_2 may be one region of the (1-2)th sensor patterns SP1_2.

The touch sensor TS may include a first conductive pattern (see CP1 shown in FIG. 5) provided on the base layer BSL, a first insulating layer INS1 provided on the first conductive pattern CP1, a second conductive pattern (see CP2 shown in FIG. 5) provided on the first insulating layer INS1, and a second insulating layer INS2 provided on the second conductive pattern CP2.

The base layer BSL may be provided on the thin film encapsulation layer TFE of the display panel DP. In some exemplary embodiments, the base layer BSL may be the uppermost layer of the thin film encapsulation layer TFE of the display panel DP. For example, the base layer BSL may be an inorganic insulating layer (or inorganic layer) as the uppermost layer of the thin film encapsulation layer TFE. In some exemplary embodiments, the base layer BSL may be an inorganic insulating layer (inorganic buffer layer) additionally disposed on the thin film encapsulation layer TFE. For example, the base layer BSL may include a silicon nitride layer, a silicon oxynitride layer, a silicon oxide layer, a titanium oxide layer, an aluminum oxide layer, or the like.

The first conductive pattern CP1 may be directly disposed on the base layer BSL. In some exemplary embodiments, the first conductive pattern CP1 may be disposed to overlap with the pixel defining layer PDL.

The first conductive pattern CP1 may include a (2-1a)th bridge pattern BRP2_1a provided and/or formed on the base layer BSL as shown in FIG. 7B. Also, the first conductive pattern CP1 may include a (1-1)th bridge pattern BRP1_1 having the same configuration as the (2-1)th bridge pattern BRP2_1. In some exemplary embodiments, the (1-1)th bridge pattern BRP1_1 provided and/or formed in the first sensing region SSA1 and the (2-1)th bridge pattern BRP2_1 provided and/or formed in the second sensing region SSA2 may be included in the first conductive pattern CP1.

The first conductive pattern CP1 may include a conductive material. The conductive material may include a transparent conductive oxide or a metallic material. Also, the first conductive pattern CP1 may include a plurality of stacked metal layers.

The first insulating layer INS1 may be provided on the first conductive pattern CP1. The first insulating layer INS1 may include the same material as the base layer BSL, but the exemplary embodiments are not limited thereto. In some exemplary embodiments, the first insulating layer INS1 may include an organic insulating layer including an organic material or an inorganic insulating layer including an inorganic material.

Like the first conductive pattern CP1, the second conductive pattern CP2 may include a single conductive material layer, or include a plurality of stacked conductive material layers. The second conductive pattern CP2 may include (2-1)th and (2-2)th sensor patterns SP2_1 and SP2_2 provided on the first insulating layer INS1 as shown in FIG. 7B. Also, the second conductive pattern CP2 may include a (2-2)th bridge pattern BRP2_2 integrally provided with the (2-2)th sensor patterns SP2_2. In addition, the second conductive pattern CP2 may include (1-1)th and (1-2)th sensor patterns SP1_1 and SP1_2 and a (1-2)th bridge pattern BRP1_2 integrally provided with each of the (1-2)th sensor patterns SP1_2. In some exemplary embodiments, the first sensor patterns SP1 and the (1-2)th bridge pattern BRP1_2, which are provided in the first sensing region SSA1, and the second sensor patterns SP2 and the (2-2)th bridge pattern BRP2_2, which are provided in the second sensing region SSA2, may be included in the second conductive pattern CP2.

(2-1)th sensor patterns SP2_1 adjacent in the first direction DR1 may be electrically and/or physically connected to each other by contact holes CNT penetrating the first insulating layer INS1 and the (2-1a)th bridge pattern BRP2_1a.

The second insulating layer INS2 may be provided on the first insulating layer INS1 on which the second conductive pattern CP2 is provided. The second insulating layer INS2 may prevent corrosion of the second conductive pattern CP2 by preventing the second conductive pattern CP2 from being exposed to the outside. The second insulating layer INS2 may be configured with an organic insulating layer including an organic material. In some exemplary embodiments, the second insulating layer INS2 may be configured with an inorganic insulating layer including an inorganic material.

In the above-described embodiment, a case where the (1-1)th bridge pattern BRP1_1 and the (2-1)th bridge pattern BRP2_1 are included in the first conductive pattern CP1, and the first and second sensor patterns SP1 and SP2, the (1-2)th bridge pattern BRP1_2, and the (2-2)th bridge pattern BRP2_2 are included in the second conductive pattern CP2 is described as an example, but the exemplary embodiments are not limited thereto. In some exemplary embodiments, the first and second sensor patterns SP1 and SP2, the (1-2)th bridge pattern BRP1_2, and the (2-2)th bridge pattern BRP2_2 may be included in the first conductive pattern CP1, and the (1-1)th bridge pattern BRP1_1 and the (2-1)th bridge pattern BRP2_1 may be included in the second conductive pattern CP2.

Also, in the above-described illustrated exemplary embodiment, the first conductive pattern CP1 is provided on the base layer BSL, and the second conductive pattern CP2 is provided on the first insulating layer INS1 is described as an example, but the exemplary embodiments are not limited thereto. In some exemplary embodiments, the first conductive pattern CP1 may be provided on the first insulating layer INS1, and the second conductive pattern CP2 may be provided on the base layer BSL.

The first and second sensor patterns SP1 and SP2 and the first and second bridge patterns BRP1 and BRP2 may be formed of a transmissive conductive layer such as ITO, IZO or ZnO.

In some exemplary embodiments, the sensor electrode provided in the first sensing region SSA1 may include dummy electrodes disposed to be spaced apart from each other between the (1-1)th and (1-2)th sensor patterns SP1_1 and SP1_2. In addition, the sensor electrode provided in the second sensing region SSA2 may include dummy electrodes disposed to be spaced apart from each other between the (2-1)th and (2-2)th sensor patterns SP2_1 and SP2_2.

The dummy electrodes are floating electrodes, and are not electrically connected to the (1-1)th, (1-2)th, (2-1)th, and (2-2)th sensor patterns SP1_1, SP1_2, SP2_1, and SP2_2. The dummy electrodes are disposed in the first and second sensing regions SSA1 and SSA2, so that a region between the (1-1)th sensor patterns SP1_1 and the (1-2)th sensor patterns SP1_2 and a region between the (2-1)th sensor patterns SP2_1 and the (2-2)th sensor patterns SP2_2 are hidden from the user.

The touch sensor TS may be formed when a unit sensor block USB is repeatedly arranged as shown in FIGS. 6 and 7A. The unit sensor block USB may be a virtual unit block with a predetermined area, which includes at least some of sensor patterns SP adjacent in the first direction DR1 and at least some of sensor patterns SP adjacent in the second direction DR2 in a corresponding sensing region. It will be understood that the unit sensor block USB corresponds to the minimum repetition unit of the arrangement of the sensor patterns SP in the corresponding sensing region.

In some exemplary embodiments, the sensing lines SL may include a plurality of first sensing lines SL1 connected to the first sensor patterns SP1 and a plurality of second sensing lines SL2 connected to the second sensor patterns SP2.

The first sensing lines SL1 may be provided in the non-sensing region NSA surrounding the first sensing region SSA1, and be electrically connected to the first sensor patterns SP1. The first sensing lines SL1 may include (1-1)th sensing lines SL1_1 electrically connected to the (1-1)th sensor patterns SP1_1 and (1-2)th sensing lines SL1_2 electrically connected to the (1-2)th sensor patterns SP1_2.

The second sensing lines SL2 may be provided in the non-sensing region NSA surrounding the second sensing region SSA2, and be electrically connected to the second sensor patterns SP2. The second sensing lines SL2 may include (2-1)th sensing lines SL2_1 electrically connected to the (2-1)th sensor patterns SP2_1 and (2-2)th sensing lines SL2_2 electrically connected to the (2-2)th sensing patterns SP2_2.

The first and second sensing lines SL1 and SL2 may be made of a conductive material. The conductive material may include one or more metals and one or more alloys thereof, a conductive polymer, a conductive metal oxide, a nano conductive material, and the like.

The first sensing lines SL1 may electrically connect the first touch pad unit TP1 and the first sensor patterns SP1. The first touch pad unit TP1 may be electrically connected to the first touch controller TS_C1 to supply a driving signal to the first sensor patterns SP1, and detect a touch position by receiving a sensing signal corresponding to the first sensor patterns SP1. The sensing signal may be a variation in mutual capacitance generated between the (1-1)th sensor patterns SP1_1 and the (1-2)th sensor patterns SP1_2. For example, when a touch input occurs, capacitance may be changed at a point at which the touch input is provided or the periphery thereof. The first touch controller TS_C1 may receive, as a sensing signal, a variation in mutual capacitance between the (1-1)th and (1-2)th sensor patterns SP1_1 and SP1_2, and detect whether the touch input is provided and/or a position of the touch input by using the variation in mutual capacitance. However, the touch detection method is not limited to that using a variation in capacitance generated between adjacent sensor patterns SP, and the first touch controller TS_C1 may detect a touch by using a variation in self-capacitance of each of the sensor patterns SP.

The second sensing lines SL2 may electrically connect the second touch pad unit TP2 and the second sensor patterns SP2. The second touch pad unit TP2 may be electrically connected to the second touch controller TS_C2 to supply a driving signal to the second sensor patterns SP2, and detect a touch position by receiving a sensing signal corresponding to the second sensor patterns SP2. The sensing signal may be a variation in capacitance generated between the (2-1)th sensor patterns SP2_1 and the (2-2)th sensor patterns SP2_2.

The sensor patterns SP may include a plurality of third sensor patterns SP3 provided between the first sensing region SSA1 and the second sensing region SSA2.

Each of the third sensor patterns SP3 may be located throughout the first sensing region SSA1 and the second sensing region SSA2. In some exemplary embodiments, each of the third sensor patterns SP3 may include a (3-1)th sub-sensor pattern SP3_1 and a (3-2)th sub-sensor pattern SP3_2, which have a substantially symmetrical structure with respect to a virtual line VL extending along the first direction DR1 between the first sensing region SSA1 and the second sensing region SSA2. The (3-1)th sub-sensor pattern SP3_1 and the (3-2)th sub-sensor pattern SP3_2 may be provided on the same layer, and be spaced apart from each other.

The (3-1)th sub-sensor pattern SP3_1 may include a first sub-electrode SE1, a second sub-electrode SE2, and a first protrusion part PRT1. The first sub-electrode SE1 may be located in the first sensing region SSA1, the second sub-electrode SE2 may be located in the second sensing region SSA2, and the first protrusion part PRT1 may be located between the first sensing region SSA1 and the second sensing region SSA2. The area (or size) of the first sub-electrode SE1 may be relatively larger than that of the second sub-electrode SE2.

The first protrusion part PRT1 may be provided between the first sub-electrode SE1 and the second sub-electrode SE2, to electrically and/or physically connect the first sub-electrode SE1 and the second sub-electrode SE2. The first protrusion part PRT1 may be integrally provided with the first sub-electrode SE1 and/or the second sub-electrode SE2.

The first sub-electrode SE1 may be electrically connected to (1-2)th sensor patterns SP1_2 located on the same sensor column through the (1-2)th bridge pattern BRP1_2 in the first sensing region SSA1. The second sub-electrode SE2 may be electrically and/or physically connected to the first sub-electrode SE1 through the first protrusion part PRT1. Therefore, the second sub-electrode SE2 may be electrically connected to the (1-2)th sensor patterns SP1_2 of the first sensing region SSA1.

The (3-2)th sub-sensor pattern SP3_2 may include a third sub-electrode SE3, a fourth sub-electrode SE4, and a second protrusion part PRT2. The third sub-electrode SE3 may be located in the second sensing region SSA2, the fourth sub-electrode SE4 may be located in the first sensing region SSA1, and the second protrusion part PRT2 may be located between the second sensing region SSA2 and the first sensing region SSA1. The area (or size) of the third sub-electrode SE3 may be relatively larger than that of the fourth sub-electrode SE4.

The second protrusion part PRT2 may be provided between the third sub-electrode SE3 and the fourth sub-electrode SE4, to electrically and/or physically connect the third sub-electrode SE3 and the fourth sub-electrode SE4. The second protrusion part PRT2 may be integrally provided with the third sub-electrode SE3 and/or the fourth sub-electrode SE4.

The third sub-electrode SE3 may be electrically connected to (2-2)th sensor patterns SP2_2 of the second sensing region SSA2, which are located on the same sensor column as the third sub-electrode SE3 through the (2-2)th bridge pattern BRP2_2. The fourth sub-electrode SE4 may be electrically and/or physically connected to the third sub-electrode SE3 through the second protrusion part PRT2. Therefore, the fourth sub-electrode SE4 may be electrically connected to the (2-2)th sensor patterns SP2_2 of the second sensing region SSA2.

The (3-1)th sub-sensor pattern SP3_1 and the (3-2)th sub-sensor pattern SP3_2 may have a substantially symmetrical structure with respect to the virtual line VL, and have the same area (or size). In some exemplary embodiments, the first sub-electrode SE1 of the (3-1)th sub-sensor pattern SP3_1 may have the same area (or size) as the third sub-electrode SE3 of the (3-2)th sub-sensor pattern SP3_2, and the second sub-electrode SE2 of the (3-1)th sub-sensor pattern SP3_1 may have the same area (or size) as the fourth sub-electrode SE4 of the (3-2)th sub-sensor pattern SP3_2. In addition, the first protrusion part PRT1 of the (3-1)th sub-sensor pattern SP3_1 may have the same area (or size) as the second protrusion part PRT2 of the (3-2)th sub-sensor pattern SP3_2.

The first to fourth sub-electrodes SE1 to SE4 and the first and second protrusion parts PRT1 and PRT2 may be provided on the same layer. In an example, the first to fourth sub-electrodes SE1 to SE4 and the first and second protrusion parts PRT1 and PRT2 may be provided on the first insulating layer INS1.

When the (3-1)th sub-sensor pattern SP3_1 and the (3-2)th sub-sensor pattern SP3_2 have substantially the same area (or size), electrical characteristics (e.g., resistance, capacitance, etc.) of the (3-1)th sub-sensor pattern SP3_1 and the (3-2)th sub-sensor pattern SP3_2 may be equal to each other. In some exemplary embodiments, the (3-1)th sub-sensor pattern SP3_1 and the (3-2)th sub-sensor pattern SP3_2 may have substantially the same capacitance. A variation in capacitance between the (3-1)th sub-sensor pattern SP3_1 and sensor patterns SP adjacent thereto and a variation in capacitance between the (3-2)th sub-sensor pattern SP3_2 and sensor patterns SP adjacent thereto may be substantially equal to each other.

When a touch is input by a user, the touch sensor TS detects a point at which the touch is input by sensing a variation in capacitance between sensor patterns SP in the first to second sensing regions SSA1 and SSA2 through the first and second touch controllers TS_C1 and TS_C2. Variations in capacitance of the (3-1)th sub-sensor pattern SP3_1 and the (3-2)th sub-sensor pattern SP3_2, which are located throughout the first sensing region SSA1 and the second sensing region SSA2, may be sensed by, respectively, the first touch controller TS_C1 and the second touch controller TS_C2.

The first touch controller TS_C1 may sense a variation in capacitance generated between the first sub-electrode SE1 of the (3-1)th sub-sensor pattern SP3_1 and the fourth sub-electrode SE4 of the (3-2)th sub-sensor pattern SP3_2 adjacent thereto. Also, the first touch controller TS_C1 may sense a variation in capacitance generated between the second sub-electrode SE2 of the (3-1)th sub-sensor pattern SP3_1 and the third and fourth sub-electrodes SE3 and SE4 of the (3-2)th sub-sensor pattern SP3_2 adjacent thereto.

The second touch controller TS_C2 may sense a variation in capacitance generated between the third sub-electrode SE3 of the (3-2)th sub-sensor pattern SP3_2 and the second sub-electrode SE2 of the (3-1)th sub-sensor pattern SP3_1 adjacent thereto. Also, the second touch controller TS_C2 may sense a variation in capacitance generated between the fourth sub-electrode SE4 of the (3-2)th sub-sensor pattern SP3_2 and the first and second sub-electrodes SE1 and SE2 of the (3-1)th sub-sensor pattern SP3_1 adjacent thereto.

As described above, with respect to each of the (3-1)th and (3-2)th sub-sensor patterns SP3_1 and SP3_2, variations in capacitance between adjacent sensor patterns SP and adjacent sub-electrodes can be sensed by the first and second touch controllers TS_C1 and TS_C2. When the sensing sensitivity in the boundary region of the first sensing region SSA1 and the second sensing region SSA2 is different from that of each of the first and second sensing regions SSA1 and SSA2, the sensing sensitivity can be accurately corrected for each of the third sensor patterns SP3, based on the variations in capacitance of the (3-1)th and (3-2)th sub-sensor patterns SP3_1 and SP3_2, which are sensed by the first and second touch controllers TS_C1 and TS_C2.

In some exemplary embodiments, the (3-1)th and (3-2)th sub-sensor patterns SP3_1 and SP3_2 may have an area (or size) relatively smaller than that of the sensor patterns SP located in each of the first and second sensing regions SSA1 and SSA2. However, since the (3-1)th and (3-2)th sub-sensor patterns SP3_1 and SP3_2 are provided throughout the first sensing region SSA1 and the second sensing region SSA2, the capacitance between adjacent sub-electrodes in each of the first and second sensing regions SSA1 and SSA2 and the capacitance between adjacent sub-electrodes in the boundary region of the first sensing region SSA1 and the second sensing region SSA2 can be sufficiently secured. The capacitance in the boundary region of the first sensing region SSA1 and the second sensing region SSA2 is increased, so that the sensing sensitivity can be improved.

In order to minimize the load in a large-area display device, the touch sensor TS may be divided into a plurality of separately driven, sensing regions. The above-described third sensor patterns SP3 are disposed in the boundary region of the sensing regions, so that the difference in sensing sensitivity generated in the divided sensing regions and the boundary region of the sensing regions can be reduced. Accordingly, the large-area display device can implement uniform sensing sensitivity throughout the entire region.

Figure 10A:
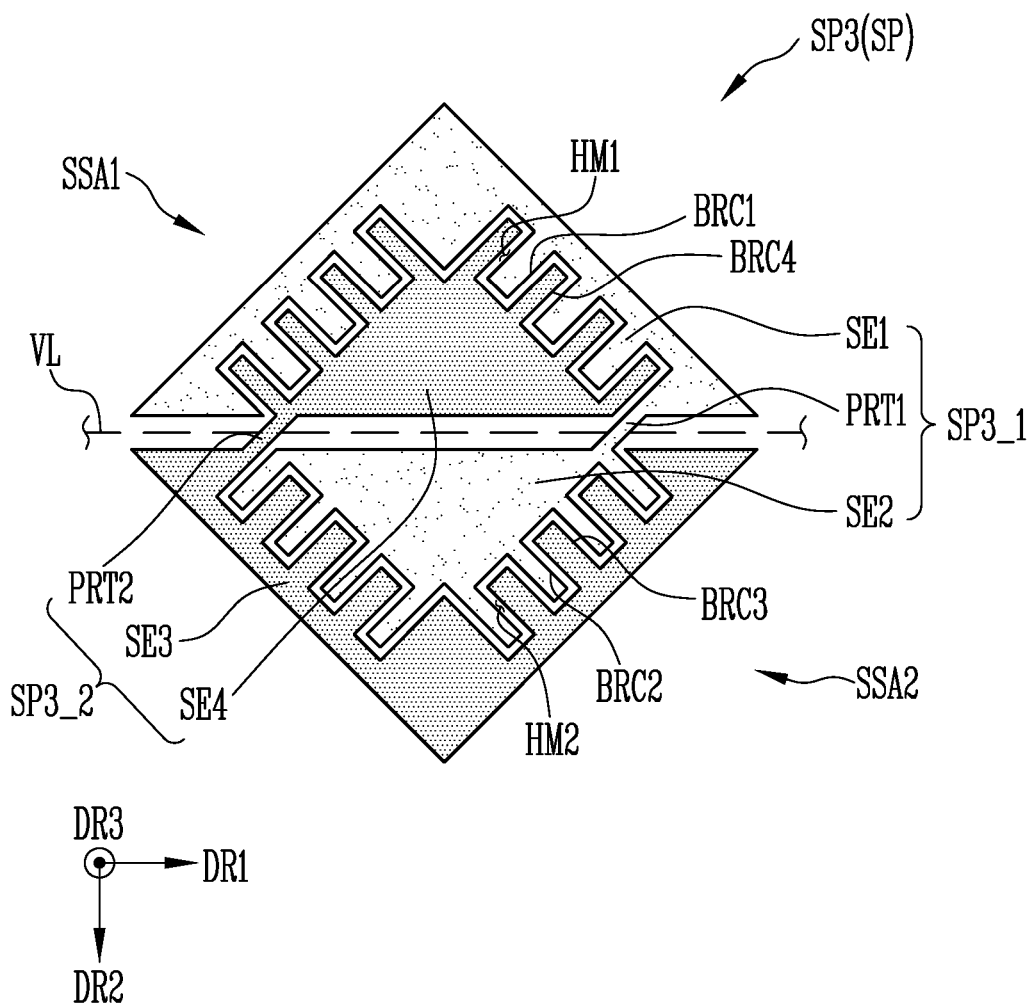
FIGS. 10A and 10B are plan views illustrating exemplary embodiments of a single third sensor pattern of the third sensor patterns of FIG. 6.
Figure 10B:
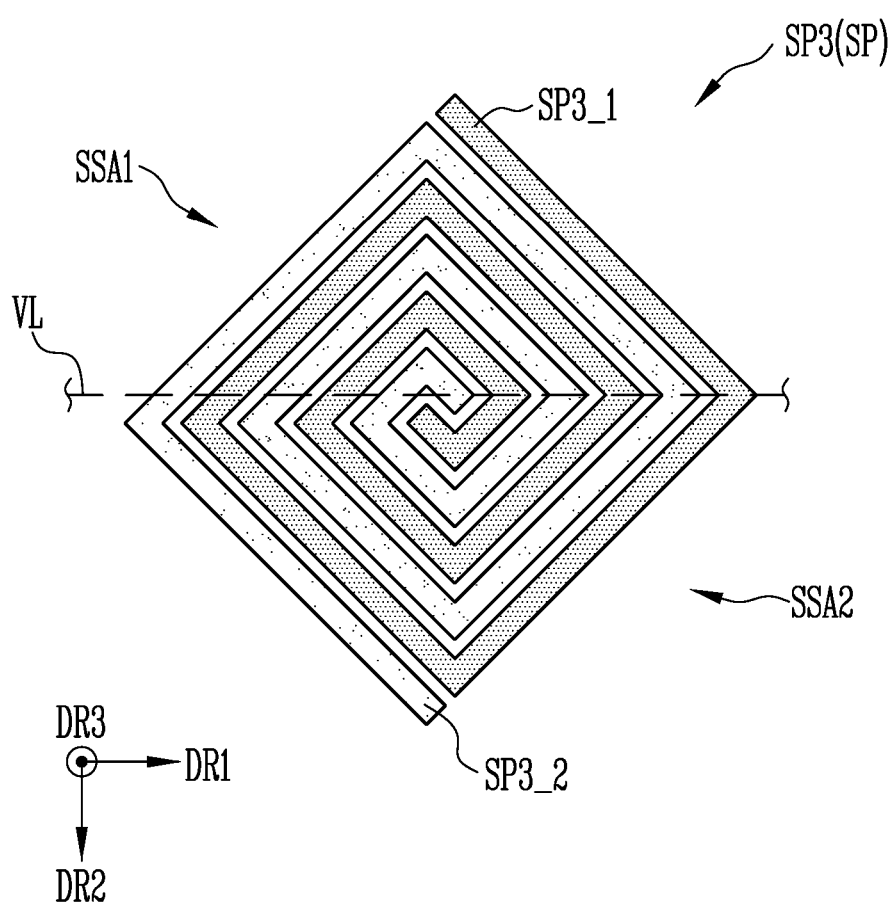

FIGS. 10A and 10B are plan views illustrating exemplary embodiments of a single third sensor pattern of the third sensor patterns of FIG. 6.

In relation to the third sensor patterns shown in FIGS. 10A and 10B, portions different from those of the above-described illustrated exemplary embodiment will be mainly described to avoid redundancy. Portions not particularly described in this illustrated exemplary embodiment follow those of the above-described illustrated exemplary embodiment. In addition, identical reference numerals refer to identical components, and similar reference numerals refer to similar components.

Referring to FIGS. 1 to 5, 8, 10A, and 10B, each third sensor pattern SP3 may include a (3-1)th sub-sensor pattern SP3_1 and a (3-2)th sub-sensor pattern SP3_2, which are located throughout the first sensing region SSA1 and the second sensing region SSA2.

In this illustrated exemplary embodiment, the (3-1)th sub-sensor pattern SP3_1 may include a first sub-electrode SE1 including a plurality of first branch electrodes BRC1, a second sub-electrode SE2 including a plurality of second branch electrodes BRC2, and a first protrusion part PRT1. The (3-2)th sub-sensor pattern SP3_2 may include a third sub-electrode SE3 including a plurality of third branch electrodes BRC3, a fourth sub-electrode SE4 including a plurality of fourth branch electrodes BRC4, and a second protrusion part PRT2.

The first branch electrodes BRC1 may be located in the first sensing region SSA1, and branch off in a direction coming close to a virtual line VL from the first sub-electrode SE1. Each of the first branch electrodes BRC1 may be spaced apart from first branch electrodes BRC1 adjacent thereto at a certain distance. A first groove part HM1 may be located between two adjacent first branch electrodes BRC1.

The second branch electrodes BRC2 may be located in the second sensing region SSA2, and branch off in a direction coming distant from the virtual line VL from the second sub-electrode SE2. Each of the second branch electrodes BRC2 may be spaced apart from the second branch electrodes BRC2 adjacent thereto at a certain distance.

The third branch electrodes BRC3 may be located in the second sensing region SSA2, and branch off in a direction coming close to the virtual lined VL from the third sub-electrode SE3. Each of the third branch electrodes BRC3 may be spaced apart from the third branch electrodes BRC3 adjacent thereto at a certain distance. A second groove part HM2 may be located between two adjacent third branch electrodes BRC3.

One second branch electrode BRC2 may be inserted into the second groove part HM2. The second branch electrodes BRC2 and the third branch electrodes BRC3 may be alternately disposed along one direction, e.g., a direction inclined with respect to the first direction DR1 or the second direction DR2. The second branch electrodes BRC2 and the third branch electrodes BRC3 may be spaced apart from each other to be electrically separated from each other.

The fourth branch electrodes BRC4 may be located in the first sensing region SSA1, and branch off in a direction coming distant from the virtual line VL from the fourth sub-electrode SE4. Each of the fourth branch electrodes BRC4 may be spaced apart from fourth branch electrodes BRC4 adjacent thereto at a certain distance.

One fourth branch electrode BRC4 may be inserted in the first groove part HM1. The first branch electrodes BRC1 and the fourth branch electrodes BRC4 may be alternately disposed along one direction, e.g., a direction inclined with respect to the first direction DR1 or the second direction DR2. The first branch electrodes BRC1 and the fourth branch electrodes BRC4 may be spaced apart from each other to be electrically separated from each other.

As described above, the (3-1)th sub-sensor pattern SP3_1 and the (3-2)th sub-sensor pattern SP3_2 may have a substantially symmetrical structure with respect to the virtual line VL, and have the same area (or size). The (3-1)th sub-sensor pattern SP3_1 and the (3-2)th sub-sensor pattern SP3_2 may have the same capacitance.

In some exemplary embodiments, each of the (3-1)th and (3-2)th sub-sensor patterns SP3_1 and SP3_2 may have a spiral-type shape converging toward the center of a corresponding third sensor pattern SP3 while repeatedly moving back and forth between the first sensing region SSA1 and the second sensing region SSA2 as shown in FIG. 10B. In an example, the (3-1)th sub-sensor pattern SP3_1 may have a spiral-type shape finally converging toward the center of a corresponding third sensor pattern SP3 by repeatedly moving back and forth to the second region SSA2 from the first sensing region SSA1 and again moving to the first sensing region SSA1 from the second sensing region SSA2. The (3-2)th sub-sensor pattern SP3_2 may have a spiral-type shape finally converging toward the center of a corresponding third sensor pattern SP3 by repeatedly moving back and forth to the first region SSA1 from the second sensing region SSA2 and again moving back and forth to the second sensing region SSA2 from the first sensing region SSA1.

The shapes of the (3-1)th and (3-2)th sub-sensor patterns SP3_1 and SP3_2 are not limited to the above-described illustrated exemplary embodiments, and may be variously implemented within a region in which the (3-1)th and (3-2)th sub-sensor patterns SP3_1 and SP3_2 have substantially the same area (or size).

Figure 11:
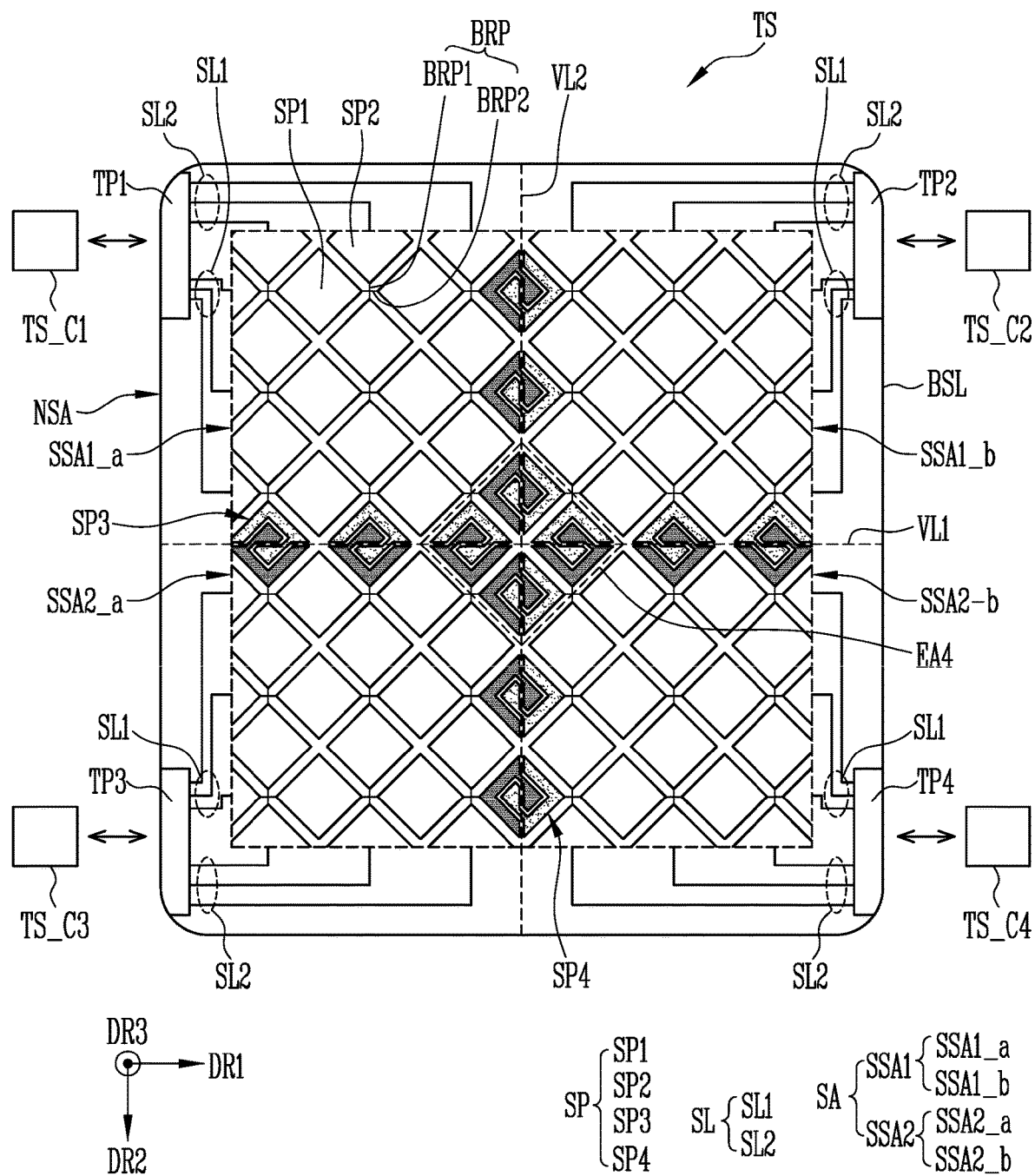
FIG. 11 is a schematic plan view of another exemplary embodiment of a touch sensor constructed according to principles of the invention.
Figure 12:
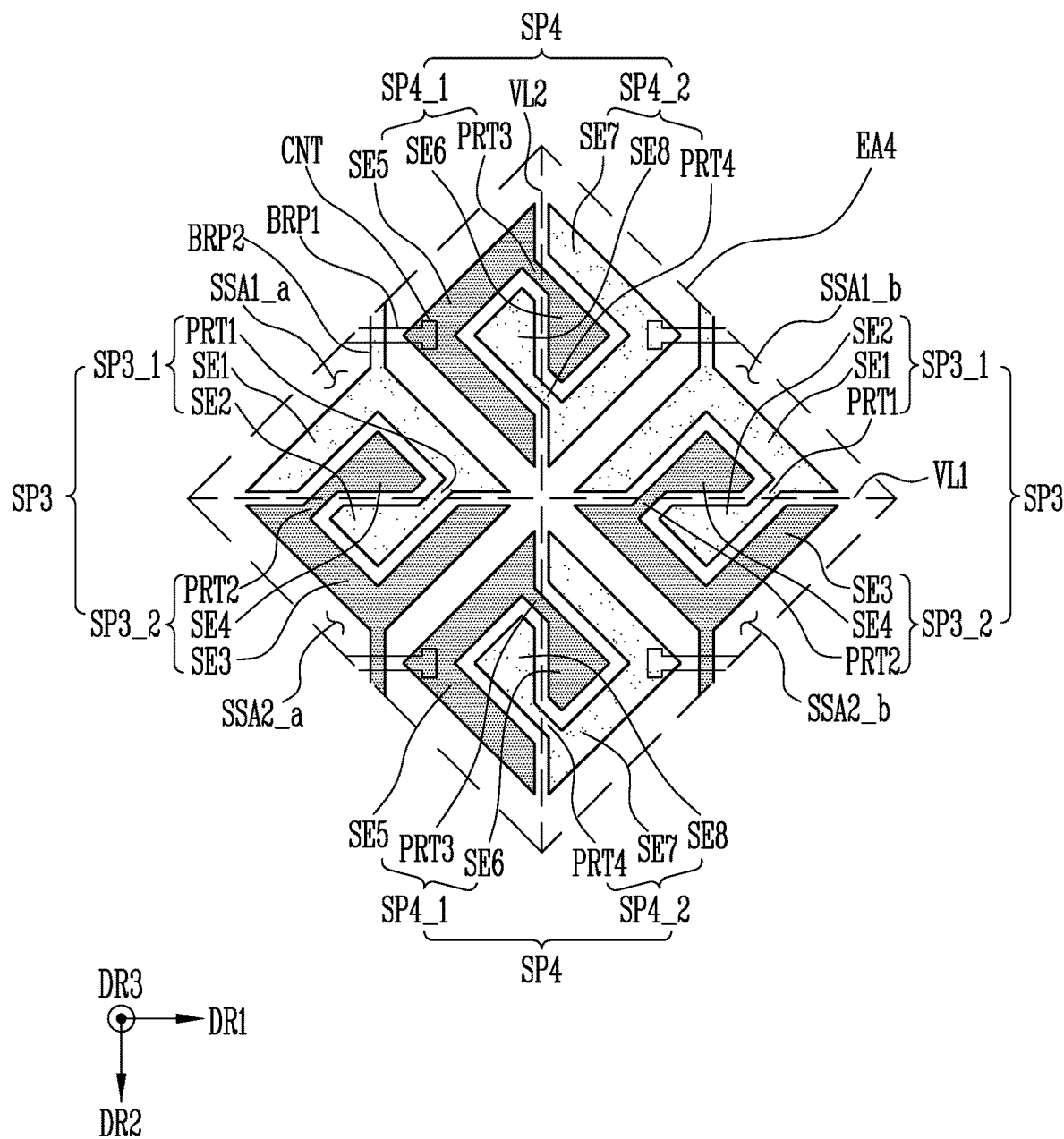
FIG. 12 is an enlarged plan view schematically illustrating of an exemplary embodiment of the portion EA4 of FIG. 11.

FIG. 11 is a schematic plan view of another exemplary embodiment of a touch sensor constructed according to principles of the invention. FIG. 12 is an enlarged plan view schematically illustrating of an exemplary embodiment of the portion EA4 of FIG. 11.

In relation to the touch sensor shown in FIGS. 11 and 12, portions different from those of the above-described illustrated exemplary embodiment will be mainly described to avoid redundancy. Portions not particularly described in this illustrated exemplary embodiment follow those of the above-described illustrated exemplary embodiment. In addition, identical reference numerals refer to identical components, and similar reference numerals refer to similar components.

Referring to FIGS. 1 to 5, 11, and 12, the touch sensor TS may include a base layer BSL including a sensing region SA and a non-sensing region NSA, and first to fourth touch controllers TS_C1, TS_C2, TS_C3, and TS_C4 for detecting a touch position input to the sensing region SA.

The sensing region SA may include a first sensing region SSA1 and a second sensing region SSA2, which are divided in a second direction DR2 and are adjacent to each other.

The first sensing region SSA1 may include a first sub-sensing region SSA1_a and a second sub-sensing region SSA1_b, which are divided along a first direction DR1. The second sensing region SSA2 may include a third sub-sensing region SSA2_a and a fourth sub-sensing region SSA2_b, which are divided along the first direction DR1. Sensor patterns SP and bridge patterns BRP may be provided and/or formed in each of the first to fourth sub-sensing regions SSA1_a, SSA1_b, SSA2_a, and SSA2_b.

Sensor patterns SP in each sub-region may include first sensor patterns SP1 arranged in the first direction DR1 and second sensor patterns SP2 arranged in the second direction DR2. Bridge patterns BRP in each sub-region may include a first bridge pattern BRP1 electrically connecting first sensor patterns SP1 to first sensor patterns SP1 adjacent in the first direction DR1 and a second bridge pattern BRP2 electrically connecting second sensor patterns SP2 to second sensor patterns SP2 adjacent in the second direction DR2.

Sensing lines SL may be provided and/or formed in the non-sensing region NSA. The sensing lines SL may be electrically connected to a sensor electrode provided and/or formed in each sub-region. In each sub-region, the sensing lines SL may include first sensing lines SL1 electrically connected to the first sensor patterns SP1 and second sensing lines SL2 electrically connected to the second sensor patterns SP2.

In addition, first to fourth touch pad units TP1 to TP4 may be disposed in the non-sensing region NSA. The first touch pad unit TP1 may be electrically connected to sensor patterns SP of the first sub-sensing region SSA1_a through the sensing lines SL, the second touch pad unit TP2 may be electrically connected to sensor patterns SP of the second sub-sensing region SSA1_b through the sensing lines SL, the third touch pad unit TP3 may be electrically connected to sensor patterns SP of the third sub-sensing region SSA2_a through the sensing lines SL, and the fourth touch pad unit TP4 may be electrically connected to sensor patterns SP of the fourth sub-sensing region SSA2_b through the sensing lines SL.

The first touch pad unit TP1 may be electrically connected to the first touch controller TS_C1 to supply a driving signal to the sensor patterns SP of the first sub-sensing region SSA1_a, and detect a touch position by receiving a variation in capacitance generated between first and second sensor patterns SP1 and SP2 of the first sub-sensing region SSA1_a. The second touch pad unit TP2 may be electrically connected to the second touch controller TS_C2 to supply a driving signal to the sensor patterns SP of the second sub-sensing region SSA1_b, and detect a touch position by receiving a variation in capacitance generated between first and second sensor patterns SP1 and SP2 of the second sub-sensing region SSA1_b. The third touch pad unit TP3 may be electrically connected to the third touch controller TS_C3 to supply a driving signal to the sensor patterns SP of the third sub-sensing region SSA2_a, and detect a touch position by receiving a variation in capacitance generated between first and second sensor patterns SP1 and SP2 of the third sub-sensing region SSA2_a. The fourth touch pad unit TP4 may be electrically connected to the fourth touch controller TS_C4 to supply a driving signal to the sensor patterns SP of the fourth sub-sensing region SSA2_b, and detect a touch position by receiving a variation in capacitance generated between first and second sensor patterns SP1 and SP2 of the fourth sub-sensing region SSA2_b.

The sensor patterns SP may include third sensor patterns SP3 and fourth sensor patterns SP4, which are located in the boundary region of the first to fourth sub-sensing regions SSA1_a, SSA1_b, SSA2_a, and SSA2_b.

The third sensor patterns SP3 may be respectively provided and/or formed between the first sub-sensing region SSA1_a and the third sub-sensing region SSA2_a and between the second sub-sensing region SSA1_b and the fourth sub-sensing region SSA2_b. In the illustrated exemplary embodiment, each of the third sensor patterns SP3 may include a (3-1)th sub-sensor pattern SP3_1 and a (3-2)th sub-sensor pattern SP3_2, which have a substantially symmetrical structure with respect to a first virtual line VL1 extending the first direction DR1 each of between the first sub-sensing region SSA1_a and the third sub-sensing region SSA2_a and between the second sub-sensing region SSA1_b and the fourth sub-sensing region SSA2_b.

The (3-1)th sub-sensor pattern SP3_1 provided between the first to third sub-sensing regions SSA1_a and SSA2_a may include a first sub-electrode SE1 located in the first sub-sensing region SSA1_a, a second sub-electrode SE2 located in the third sub-sensing region SSA2_a, and a first protrusion part PRT1 electrically and/or physically connecting the first sub-electrode SE1 and the second sub-electrode SE2. The first protrusion part PRT1 may be provided between the first sub-sensing region SSA1_a and the third sub-sensing region SSA2_a. The (3-1)th sub-sensor pattern SP3_1 may be electrically connected to second sensor patterns SP2 of the first sub-sensing region SSA1_a, which are located on the same sensor column as the (3-1)th sub-sensor pattern SP3_1 through the second bridge pattern BRP2.

The (3-1)th sub-sensor pattern SP3_1 provided between the second and fourth sub-sensing regions SSA1_b and SSA2_b may include a first sub-electrode SE1 located in the second sub-sensing region SSA1_b, a second sub-electrode SE2 located in the fourth sub-sensing region SSA2_b, and a first protrusion part PRT1 electrically and/or physically connecting the first sub-electrode SE1 and the second sub-electrode SE2. The first protrusion part PRT1 may be provided between the second sub-sensing region SSA1_b and the fourth sub-sensing region SSA2_b. The (3-1)th sub-sensor pattern SP3_1 may be electrically connected to second sensor patterns SP2 of the second sub-sensing region SSA1_b, which are located on the same sensor column as the (3-1)th sub-sensor pattern SP3_1 through the second bridge pattern BRP2.

The (3-2)th sub-sensor pattern SP3_2 provided between the first and third sub-sensing regions SSA1_a and SSA2_a may include a third sub-electrode SE3 located in the third sub-sensing region SSA2_a, a fourth sub-electrode SE4 located in the first sub-sensing region SSA1_a, and a second protrusion part PRT2 electrically and/or physically connecting the third sub-electrode SE3 and the fourth sub-electrode SE4. The second protrusion part PRT2 may be provided between the first sub-sensing region SSA1_a and the third sub-sensing region SSA2_a. The (3-2)th sub-sensor pattern SP3_2 may be electrically connected to second sensor patterns SP2 of the third sub-sensing region SSA2_a, which are located on the same sensor column as the (3-2)th sub-sensor pattern SP3_2 through the second bridge pattern BRP2.

The (3-2)th sub-sensor pattern SP3_2 provided between the second and fourth sub-sensing regions SSA1_b and SSA2_b may include a third sub-electrode SE3 located in the fourth sub-sensing region SSA2_b, a fourth sub-electrode SE4 located in the second sub-sensing region SSA1_b, and a second protrusion part PRT2 electrically and/or physically connecting the third sub-electrode SE3 and the fourth sub-electrode SE4. The second protrusion part PRT2 may be provided between the second sub-sensing region SSA1_b and the fourth sub-sensing region SSA2_b. The (3-2)th sub-sensor pattern SP3_2 may be electrically connected to second sensor patterns SP2 of the fourth sub-sensing region SSA2_b, which are located on the same sensor column as the (3-2)th sub-sensor pattern SP3_2 through the second bridge pattern BRP2.

As described above, between each of the first sub-sensing region SSA1_a and the third sub-sensing region SSA2_a and between the second sub-sensing region SSA1_b and the fourth sub-sensing region SSA2_b, the (3-1)th sub-sensor pattern SP3_1 and the (3-2)th sub-sensor pattern SP3_2 may have a substantially symmetrical structure with respect to the first virtual line VL1, and have the same area (or size). Therefore, the (3-1)th sub-sensor pattern SP3_1 and the (3-2)th sub-sensor pattern SP3_2 may have substantially the same capacitance. The variation in capacitance between the (3-1)th sub-sensor pattern SP3_1 and sensor patterns SP adjacent thereto and the variation in capacitance between the (3-2)th sub-sensor pattern SP3_2 and sensor patterns SP adjacent thereto may be substantially the same.

The fourth sensor patterns SP4 may be respectively provided and/or formed between the first sub-sensing region SSA1_a and the second sub-sensing region SSA1_b and between the third sub-sensing region SSA2_a and the fourth sub-sensing region SSA2_b. In the illustrated exemplary embodiment, each of the fourth sensor patterns SP4 may include a (4-1)th sub-sensor pattern SP4_1 and a (4-2)th sub-sensor pattern SP4_2, which have a substantially symmetrical structure with respect to a second virtual line VL2 extending the second direction DR2 each of between the first sub-sensing region SSA1_a and the second sub-sensing region SSA1_b and between the third sub-sensing region SSA2_a and the fourth sub-sensing region SSA2_b.

The (4-1)th sub-sensor pattern SP4_1 provided between the first to second sub-sensing regions SSA1_a and SSA1_b may include a fifth sub-electrode SE5 located in the first sub-sensing region SSA1_a, a sixth sub-electrode SE6 located in the second sub-sensing region SSA1_b, and a third protrusion part PRT3 electrically and/or physically connecting the fifth sub-electrode SE5 and the sixth sub-electrode SE6. The third protrusion part PRT3 may be provided between the first sub-sensing region SSA1_a and the second sub-sensing region SSA1_b. The (4-1)th sub-sensor pattern SP4_1 may be electrically connected to first sensor patterns SP1 of the first sub-sensing region SSA1_a, which are located on the same sensor row as the (4-1)th sub-sensor pattern SP4_1 through a contact hole CNT and the first bridge pattern BRP1.

The (4-1)th sub-sensor pattern SP4_1 provided between the third and fourth sub-sensing regions SSA2_a and SSA2_b may include a fifth sub-electrode SE5 located in the third sub-sensing region SSA2_a, a sixth sub-electrode SE6 located in the fourth sub-sensing region SSA2_b, and a third protrusion part PRT3 electrically and/or physically connecting the fifth sub-electrode SE5 and the sixth sub-electrode SE6. The third protrusion part PRT3 may be provided between the third sub-sensing region SSA2_a and the fourth sub-sensing region SSA2_b. The (4-1)th sub-sensor pattern SP4_1 may be electrically connected to first sensor patterns SP1 of the third sub-sensing region SSA2_a, which are located on the same sensor column as the (4-1)th sub-sensor pattern SP4_1 through a contact hole CNT and the first bridge pattern BRP1.

The (4-2)th sub-sensor pattern SP4_2 provided between the first and second sub-sensing regions SSA1_a and SSA1_b may include a seventh sub-electrode SE7 located in the second sub-sensing region SSA1_b, an eighth sub-electrode SE8 located in the first sub-sensing region SSA1_a, and a fourth protrusion part PRT4 electrically and/or physically connecting the seventh sub-electrode SE7 and the eighth sub-electrode SE8. The fourth protrusion part PRT4 may be provided between the first sub-sensing region SSA1_a and the second sub-sensing region SSA1_b. The (4-2)th sub-sensor pattern SP4_2 may be electrically connected to first sensor patterns SP1 of the second sub-sensing region SSA1_b, which are located on the same sensor column as the (4-2)th sub-sensor pattern SP4_2 through a contact hole CNT and the first bridge pattern BRP1.

The (4-2)th sub-sensor pattern SP3_2 provided between the third and fourth sub-sensing regions SSA2_a and SSA2_b may include a seventh sub-electrode SE7 located in the fourth sub-sensing region SSA2_b, an eighth sub-electrode SE8 located in the third sub-sensing region SSA2_a, and a fourth protrusion part PRT4 electrically and/or physically connecting the seventh sub-electrode SE7 and the eighth sub-electrode SE8. The fourth protrusion part PRT4 may be provided between the third sub-sensing region SSA2_a and the fourth sub-sensing region SSA2_b. The (4-2)th sub-sensor pattern SP4_2 may be electrically connected to first sensor patterns SP1 of the fourth sub-sensing region SSA2_b, which are located on the same sensor column as the (4-2)th sub-sensor pattern SP4_2 through a contact hole CNT and the first bridge pattern BRP1.

As described above, between each of the first sub-sensing region SSA1_a and the second sub-sensing region SSA1_b and between the third sub-sensing region SSA2_a and the fourth sub-sensing region SSA2_b, the (4-1)th sub-sensor pattern SP4_1 and the (4-2)th sub-sensor pattern SP4_2 may have a substantially symmetrical structure with respect to the second virtual line VL2, and have substantially the same area (or size). Therefore, the (4-1)th sub-sensor pattern SP4_1 and the (4-2)th sub-sensor pattern SP4_2 may have substantially the same capacitance. The variation in capacitance between the (4-1)th sub-sensor pattern SP4_1 and sensor patterns SP adjacent thereto and the variation in capacitance between the (4-2)th sub-sensor pattern SP4_2 and sensor patterns SP adjacent thereto may be substantially the same.

Each of the first to fourth touch controllers TS_C1, TS_C2, TS_C3, and TS_C4 may sense the variation in capacitance generated between the (3-1)th, (3-2)th, (4-1)th, and (4-2)th sub-sensor patterns SP3_1, SP3_2, SP4_1, and SP4_2 located in the boundary region of the first to fourth sub-sensing regions SSA1_a, SSA1_b, SSA2_a, and SSA2_b. Accordingly, the sensing sensitivity can be accurately corrected for each of the third and fourth sensor patterns SP3 and SP4 located in the boundary region of the first to fourth sub-sensing regions SSA1_a, SSA1_b, SSA2_a, and SSA2_b, based on the variation in capacitance, which is sensed in each of the first to fourth touch controllers TS_C1, TS_C2, TS_C3, and TS_C4.

In accordance with at least some exemplary embodiments of the invention, the touch sensor is divided into a first sensing region and a second sensing region in one direction, and at least one sensor pattern which is electrically separated between the first sensing region and the second sensing region and includes first and second sub-sensor patterns having substantially the same size is provided throughout the first and second sensing regions, so that the sensing sensitivity in the boundary of the first and second sensing regions can be improved.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A touch sensor for a display device comprising:
    a base layer including first and second sensing regions adjacent to each other in a first direction and a non-sensing region surrounding at least one side of each of the first and second sensing regions;
    first sensors disposed in each of the first and second sensing regions, the first sensors being arranged along a second direction intersecting the first direction, the first sensors being electrically connected to each other along the second direction;
    second sensors disposed in each of the first and second sensing regions, the second sensors being arranged along the first direction, the second sensors being electrically connected to each other along the first direction; and
    at least one third sensor located in the first sensing region and the second sensing region,
    wherein the at least one third sensor includes first and second sub-sensors electrically separated at a boundary between the first sensing region and the second sensing region, and the first and second sub-sensors have substantially the same size,
    wherein the first sub-sensor includes a first sub-electrode located in the first sensing region, a second sub-electrode located in the second sensing region, and a first part connecting the first and second sub-electrodes, and
    wherein the second sub-sensor includes a third sub-electrode located in the second sensing region, a fourth sub-electrode located in the first sensing region, and a second part connecting the third and fourth sub-electrodes.

2. The touch sensor of claim 1, wherein the first sensing region comprises first and second sub-sensing regions adjacent to each other in the second direction, and
    the second sensing region comprises third and fourth sub-sensing regions adjacent to each other in the second direction,
    wherein the touch sensor further comprises at least one fourth sensor disposed between the first and second sub-sensing regions and between the third and fourth sub-sensing regions, and the at least one third sensor comprises a third sensor pattern disposed between the first sub-sensing region and the third sub-sensing region and between the second sub-sensing region and the fourth sub-sensing region.

3. The touch sensor of claim 2, wherein the third sensor pattern comprises (3-1)th and (3-2)th sub-sensor patterns spaced apart from each other at a boundary between the first sub-sensing region and the third sub-sensing region and a boundary between the second sub-sensing region and the fourth sub-sensing region, and
    the at least one fourth sensor comprises a fourth sensor pattern including (4-1)th and (4-2)th sub-sensor patterns spaced apart from each other at a boundary between the first sub-sensing region and the second sub-sensing region and a boundary between the third sub-sensing region and the fourth sub-sensing region.

4. The touch sensor of claim 3, wherein the (3-1)th sub-sensor pattern and the (3-2)th sub-sensor pattern have substantially the same size, and
    the (4-1)th sub-sensor pattern and the (4-2)th sub-sensor pattern have substantially the same size.

5. The touch sensor of claim 4, wherein the (3-1)th sub-sensor pattern and the (3-2)th sub-sensor pattern have a substantially symmetrical structure with respect to a first boundary line extending along the second direction between the first sub-sensing region and the third sub-sensing region and between the second sub-sensing region and the fourth sub-sensing region, and
    the (4-1)th sub-sensor pattern and the (4-2)th sub-sensor pattern have a substantially symmetrical structure with respect to a second boundary line extending along the first direction between the first sub-sensing region and the second sub-sensing region and between the third sub-sensing region and the fourth sub-sensing region.

6. The touch sensor of claim 5, wherein the (3-1)th sub-sensor pattern comprises a fifth sub-electrode located in each of the first sub-sensing region and the second sub-sensing region, a sixth sub-electrode located in each of the third sub-sensing region and the fourth sub-sensing region, and a third part connecting the fifth sub-electrode and the sixth sub-electrode,
    the (3-2)th sub-sensor pattern comprises a seventh sub-electrode located in each of the third sub-sensing region and the fourth sub-sensing region, an eighth sub-electrode located in each of the first sub-sensing region and the second sub-sensing region, and a fourth part connecting the seventh sub-electrode and the eighth sub-electrode,
    the (4-1)th sub-sensor pattern comprises a ninth sub-electrode located in each of the first sub-sensing region and the third sub-sensing region, a tenth sub-electrode located in each of the second sub-sensing region and the fourth sub-sensing region, and a fifth part connecting the ninth sub-electrode and the tenth sub-electrode, and
    the (4-2)th sub-sensor pattern comprises an eleventh sub-electrode located in each of the second sub-sensing region and the fourth sub-sensing region, a twelfth sub-electrode located in each of the first sub-sensing region and the third sub-sensing region, and a sixth part connecting the eleventh sub-electrode and the twelfth sub-electrode.

7. The touch sensor of claim 2, further comprising:
    a first pad unit disposed in the non-sensing region, the first pad unit being electrically connected to the first and second sensor of the first sub-sensing region;
    a second pad unit disposed in the non-sensing region, the second pad unit being electrically connected to the first and second sensor of the second sub-sensing region;
    a third pad unit disposed in the non-sensing region, the third pad unit being electrically connected to the first and second sensor of the third sub-sensing region; and a fourth pad unit disposed in the non-sensing region, the fourth pad unit being electrically connected to the first and second sensor of the fourth sub-sensing region.

8. The touch sensor of claim 1, wherein the first sensors comprise first sensor patterns, the second sensors comprise second sensor patterns, the at least one third sensor comprises a third sensor pattern, and the first and second sub-sensors comprise first and second sub-sensor patterns, the boundary comprises a boundary line extending along the second direction generally perpendicular to the first sensing region and the second sensing region, and the first sub-sensor pattern and the second sub-sensor pattern have a substantially symmetrical structure with respect to the boundary line.

9. The touch sensor of claim 8, wherein the first sub-electrode and the fourth sub-electrode are spaced apart from each other in the first sensing region, and the second sub-electrode and the third sub-electrode are spaced apart from each other in the second sensing region,
wherein each of the first and second parts is located at the boundary line between the first sensing region and the second sensing region.

10. The touch sensor of claim 9, wherein the first part comprises a first protrusion part integral with at least one of the first and second sub-electrodes, and
the second part comprises a second protrusion part integral with at least one of the third and fourth sub-electrodes.

11. The touch sensor of claim 10, wherein the first sub-electrode has substantially the same size as the third sub-electrode, the second sub-electrode has substantially the same size as the fourth sub-electrode, and the first protrusion part has substantially the same size as the second protrusion part.

12. The touch sensor of claim 8, wherein each of the first to fourth sub-electrodes comprises branch electrodes,
wherein at least one of the branch electrodes of the second sub-electrode is inserted into a groove between the branch electrodes of the third sub-electrode, and
at least one of the branch electrodes of the fourth sub-electrode is inserted into a groove between the branch electrodes of the first sub-electrode.

13. The touch sensor of claim 12, wherein the branch electrodes of the first sub-electrode and the branch electrodes of the fourth sub-electrode are alternately disposed in the first sensing region, and
the branch electrodes of the second sub-electrode and the branch electrodes of the third sub-electrode are alternately disposed in the second sensing region.

14. The touch sensor of claim 8, further comprising:
a first pad unit disposed in the non-sensing region, the first pad unit being electrically connected to the first and second sensor patterns of the first sensing region; and
a second pad unit disposed in the non-sensing region, the second pad unit being electrically connected to the first and second sensor patterns of the second sensing region.

15. The touch sensor of claim 14, wherein the first pad unit and the second pad unit are electrically connected to different touch drivers,
wherein the first sub-sensor pattern is electrically connected to the first pad unit, and the second sub-sensor pattern is electrically connected to the second pad unit.

16. A display device comprising:
a display panel to display an image; and
a touch sensor disposed on the display panel, wherein the touch sensor includes:

a base layer including first and second sensing regions adjacent to each other in a first direction and a non-sensing region surrounding at least one side of each of the first and second sensing regions;
first sensors disposed in each of the first and second sensing regions, the first sensors being arranged along the first direction, the first sensors being electrically connected to each other along the first direction;
second sensors disposed in each of the first and second sensing regions, the second sensors being arranged along a second direction, the second sensors being electrically connected to each other along the second direction; and
at least one third sensor located in the first sensing region and the second sensing region,
wherein the at least one third sensor includes first and second sub-sensor patterns spaced apart from each other at a boundary between the first sensing region and the second sensing region, and the first and second sub-sensor patterns have substantially the same size,
wherein the first sub-sensor pattern includes a first sub-electrode located in the first sensing region, a second sub-electrode located in the second sensing region, and a first part connecting the first and second sub-electrodes, and
wherein the second sub-sensor pattern includes a third sub-electrode located in the second sensing region, a fourth sub-electrode located in the first sensing region, and a second part connecting the third and fourth sub-electrodes.

17. The display device of claim 16, wherein the first sub-sensor pattern and the second sub-sensor pattern have a substantially symmetrical structure with respect to the boundary which comprises a boundary line extending along the second direction intersecting the first direction between the first sensing region and the second sensing region; and
the first sensors comprise first sensor patterns, the second sensors comprise second sensor patterns, and the at least one third sensor comprises a third sensor pattern.

18. The display device of claim 17, wherein the display panel comprises:
a substrate for a display region to display an image and a non-display region disposed at least one side of the display region;
a pixel circuit layer disposed on the substrate, the pixel circuit layer including at least one transistor;
a display element layer disposed on the pixel circuit layer, the display element layer including at least one light emitting device emitting light; and
an encapsulation layer disposed on the display element layer.

19. A touch sensor for a display device comprising:
a base layer including first and second sensing regions adjacent to each other in a first direction and a non-sensing region surrounding at least one side of each of the first and second sensing regions;
first sensors disposed in each of the first and second sensing regions, the first sensors being arranged along a second direction intersecting the first direction, the first sensors being electrically connected to each other along the second direction;
second sensors disposed in each of the first and second sensing regions, the second sensors being arranged along the first direction, the second sensors being electrically connected to each other along the first direction; and at least one third sensor located in the first sensing region and the second sensing region, wherein the at least one third sensor includes first and second sub-sensors electrically separated at a boundary between the first sensing region and the second sensing region, and the first and second sub-sensors have substantially the same size, wherein the first sub-sensor has a shape converging toward the center of the third sensor and extending back and forth between the first sensing region and the second sensing region, and wherein the second sub-sensor has a shape converging toward the center of the third sensor and extending back and forth between the second sensing region and the first sensing region.

* * * * *